(12) United States Patent
Elron et al.

(10) Patent No.: US 12,361,515 B2
(45) Date of Patent: Jul. 15, 2025

(54) METHOD AND SYSTEM OF REAL-TIME SUPER-RESOLUTION IMAGE PROCESSING

(71) Applicant: Intel Corporation, Santa Clara, CA (US)

(72) Inventors: Noam Elron, Tel Aviv (IL); Alexander Itskovich, Haifa (IL); Shahar S Yuval, Haifa (IL); Noam Levy, Karmiel (IL)

(73) Assignee: Intel Corporation, Santa Clara, CA (US)

(*) Notice: Subject to any disclaimer, the term of this patent is extended or adjusted under 35 U.S.C. 154(b) by 892 days.

(21) Appl. No.: 17/213,489

(22) Filed: Mar. 26, 2021

(65) Prior Publication Data

US 2021/0233210 A1    Jul. 29, 2021

(51) Int. Cl.
*G06T 3/4053* (2024.01)
*G06N 3/08* (2023.01)
*G06T 3/4046* (2024.01)
*G06T 5/50* (2006.01)
*G06T 5/70* (2024.01)

(52) U.S. Cl.
CPC ............. *G06T 3/4053* (2013.01); *G06N 3/08* (2013.01); *G06T 3/4046* (2013.01); *G06T 5/50* (2013.01); *G06T 5/70* (2024.01)

(58) Field of Classification Search
CPC ....... G06T 3/4053; G06T 3/4046; G06T 5/50; G06T 5/70; G06T 3/4076; G06T 2207/10016; G06T 2207/20024; G06T 2207/20081; G06T 2207/20084; G06T 5/73; G06N 3/08; G06N 3/045
See application file for complete search history.

(56) References Cited

U.S. PATENT DOCUMENTS

| | | | |
|---|---|---|---|
| 2017/0256033 A1* | 9/2017 | Tuzel | G06T 3/4046 |
| 2020/0090305 A1* | 3/2020 | El-Khamy | G06N 3/08 |
| 2020/0402205 A1* | 12/2020 | Su | G06T 5/70 |

OTHER PUBLICATIONS

Yang et al., "Deep Learning for Single Image Super-Resolution: A Brief Review", in IEEE Transactions on Multimedia, vol. 21, No. 12, 2019, 16 pages.
Wang et al., "Deep Learning for Image Super-resolution: A Survey", in IEEE Transactions on Pattern Analysis and Machine Intelligence, 2020, 24 pages.
Haris et al., "Deep Back-Projection Networks for Super-Resolution", CVPR 2018, 10 pages.
Bell-Kligler et al., "Blind Super-Resolution Kernel Estimation using an Internal-GAN", NIPS 2019, 10 pages.

* cited by examiner

*Primary Examiner* — Phuoc Tran
(74) *Attorney, Agent, or Firm* — Hanley, Flight & Zimmerman, LLC

(57) ABSTRACT

A method, system, and article is directed to real-time super-resolution image processing using neural networks.

20 Claims, 10 Drawing Sheets

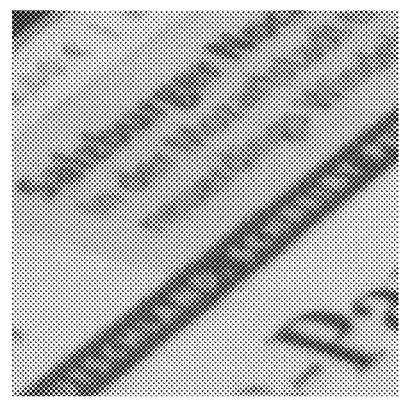
FIG. 1
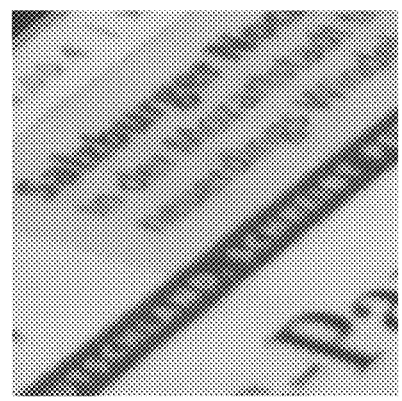
FIG. 2
FIG. 3
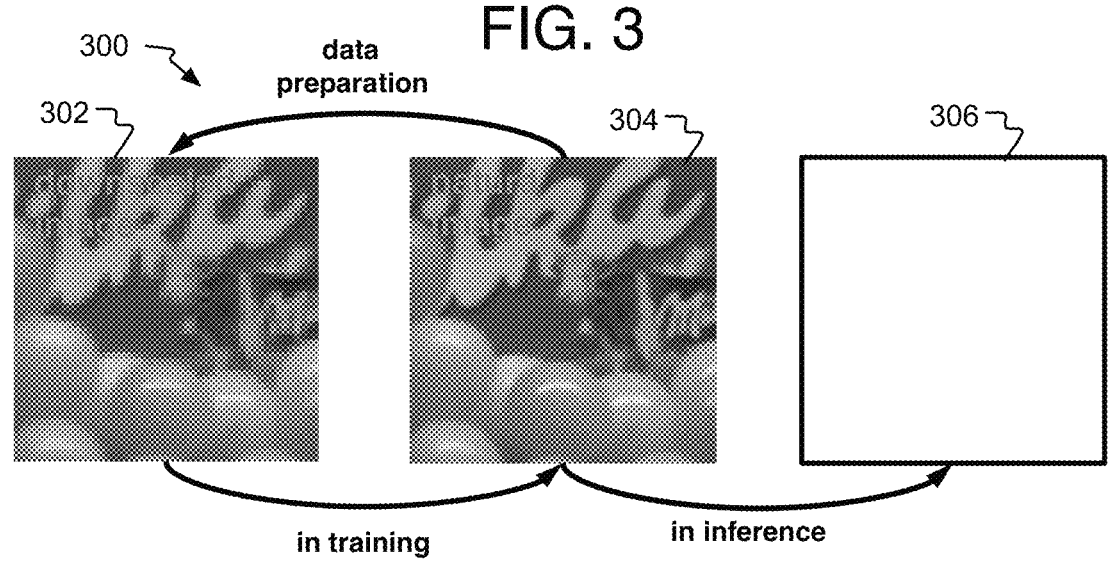
data preparation
in training    in inference
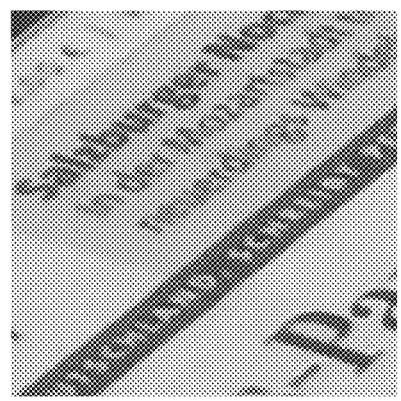
FIG. 4

METHOD AND SYSTEM OF REAL-TIME SUPER-RESOLUTION IMAGE PROCESSING

BACKGROUND

Super-resolution (SR) imaging is the upscaling of a lower resolution (LR) image to a higher resolution (HR) image, and is often performed to render videos of frame sequences in HR. The conventional real-time techniques, however, still provide poor quality images when handling real-world, camera-captured images. Also, high quality SR techniques are often neural network-based, and therefore very computationally heavy, and in turn, relatively slow, such that these high quality network-based conventional super-resolution techniques cannot perform super-resolution conversion to provide HR video in real-time on small or edge devices.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is an original LR image upscaled by a conventional method;

FIG. 2 is the same image of FIG. 1 upscaled by using deep back-projection networks;

FIG. 3 is an explanatory schematic diagram of a conventional super-resolution process;

FIG. 4 is the same image of FIG. 1 upscaled by using real-time super-resolution image processing according to at least one of the implementations herein;

DETAILED DESCRIPTION

Figure 5:
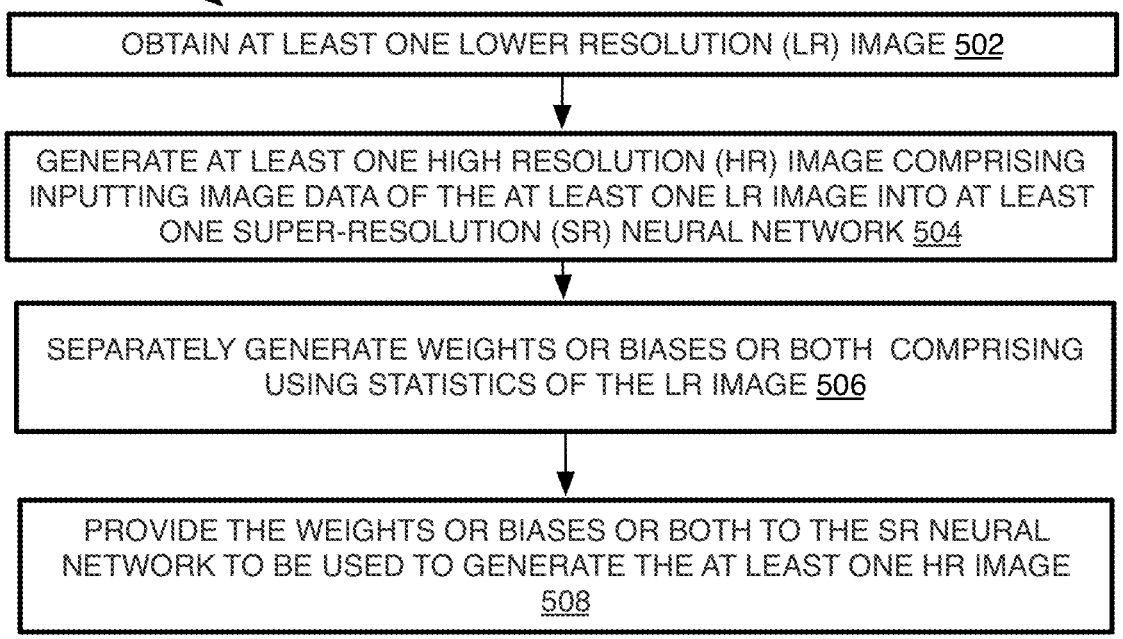
FIG. 5 is a flow chart of a run-time method of real-time super-resolution image processing in accordance with at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, televisions, smart-monitors, smartphones, cameras, laptop computers, tablets, other edge type of devices such as internet-of-things (IoT) devices including kitchen or laundry appliances, home security systems, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof unless stated otherwise. The material disclosed herein may also be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, media, and methods of real-time super-resolution image processing are described herein.

Referring to FIG. 1, conventional non-network super-resolution techniques typically apply interpolation of low resolution (LR) pixel data to generate high resolution (HR) pixel data, such as with bicubic interpolation. These techniques usually produce relatively low quality HR images. For example, a blurred non-network-based image 100 is an original image upscaled by simple interpolation to a certain image size to compare to other HR images herein. This was obtained for video SR demonstration and comparisons by capturing real-world images using a Sony IMX362 sensor and wherein the images were upscaled by four (×4). This same video was used for the following comparison.

Referring to FIG. 2, conventional high quality SR techniques are more sophisticated and use neural networks to compute the HR image data. One example technique is deep back-projection networks (DBPNs). Other SR neural network techniques specifically improve the generalization of learning-based SR networks. These SR network techniques, however, have very large computational loads due to a very large number of network parameters and/or operations per pixel such that the resulting images in real-time are still quite inadequate and appear blurred. For example, a DBPN image 200 has less blur than non-network-based image 100 but still is very blurred and inadequate. In fact, many of these network techniques would not work at all on small or edge devices that do not have the power capacity and computing capacity for such heavy loads. Experimental results for this comparison are mentioned below on Table 1.

Other conventional SR network techniques may provide good quality pictures in real-time but only for high-end computers. Such techniques require relatively very large amounts of power and specialized, large footprint graphics processing units, such as on desktops or servers. Such techniques cannot provide quality SR images on small mobile or edge devices, for example.

Generally, state-of-the-art SR models (based on deep-learning) are very large and compute-intensive. Specifically, typical SR neural networks have what may be referred to as suspiciously large receptive fields. Thus, it has been deduced that the neural networks are most likely implicitly performing statistics-estimation while propagating the pixel related tokens. Usually, only the image input is inputted at the input nodes of the SR NN with every frame being analyzed. The implicit statistics-estimation in the neural network most likely substantially increases the required size of the neural network, and in turn, the computational load, processing time, and power consumption of the neural network. Thus, the resulting sharpness of the images obtained in real-time are usually inadequate or are impossible to produce in real-time. This also results in uncontrolled randomness in the SR NN when external, intentional control of the statistics can make the process more efficient with better performance while increasing the sharpness or other quality of the HR images. Note that the terms frame, image, and picture herein are used interchangeably.

Referring to FIG. 3, also, these conventional network techniques mostly rely on a well-known downscaling training protocol that includes first downscaling an HR image 304 to generate an input downscaled LR image 302 for training. Then, during the actual training, SR neural network parameters are generated by inputting the downscaled LR image 302 into the training network while the corresponding HR image 304 is set as the output to form a supervised network. It is commonly inferred that the real-world input images are sufficiently close to the downscaled training images 302 so that resulting run-time HR images 306 will have good quality. This is incorrect, however, because the downscaled LR training images 302 have different characteristics than real-world images. Specifically, training the neural network on the corresponding downscaled images 302 omits factoring many different image data parameters and conditions that can give real-world images various imperfections including blur measured by variable point spread functions (PSFs) that depend on the camera used as explained in detail below, noise-level, tone-mapping, and so forth. In other words, the resulting run-time output HR images 306 generated by using the downscaled input images 302 tend to have unnatural, very sharp features, and therefore, the conventional CNN is trained on a specific type of overly sharp input images such that the CNN does not generalize well to other lower-quality natural (or real-world) images. These downscaled images also have an artificially low level of noise due to noise averaging caused by the downscaling. Thus, these downscaled images 302 do not adequately represent real-world images, and as a result, conventional SR neural networks perform badly when the input to the network is real-world, relatively lower-quality low-resolution images rather than artificial images formed by downscaling a high resolution image. With this conventional training protocol then, the resulting network does not adapt to varying image conditions and provides poor quality images.

To resolve these issues, a super-resolution imaging technique is provided herein that converts LR images to high quality, relatively and substantially sharper HR images in real-time and on small or edge devices, as well as provide much greater efficiency on higher-end, larger capacity devices. Herein, such small devices may include mobile devices including tablets, smartphones, and other wearable smart devices, and edge devices refer to low power devices, such as battery powered devices that use about 15 Watts or less. These edge devices may include internet-of-things (IoT) devices on appliances, building systems, vehicles, and so forth and that usually provide wireless or wired access to a WAN including the internet or a LAN. Otherwise, the disclosed SR method and system is not limited to any particular device.

To accomplish these results, the disclosed method and system provide two strategies. (1) An efficient neural network (NN) structure operated by efficient parallel NN pipeline architecture enables real-time application of video SR at least on low-power small or edge devices. This is accomplished by using global statistical properties and user preferences as weights and/or bias for the NN rather than relying on the implicit operation of the NN and tuning of values for user preferences. (2) A SR NN training protocol increases the quality of the resulting run-time HR images by factoring local properties of the images including expected imperfections in the captured images caused by camera lens variations or camera operations. Either of these strategies may be used alone or may be arranged to be used together.

With regard to the disclosed efficient NN and NN architecture, it was determined that the system can externalize and control image statistics-estimation and user preferences to generate weights and bias values for a processing NN generating the HR images rather than implicitly re-estimating statistics and inputting user preference values into the input nodes of the processing NN along with the input LR image data. In order to implement this technique, two parallel flows may be used: a pixel-processing flow with the processing NN, and a control or side flow with a statistics unit to generate (or estimate) statistics based on the LR images and a weight engine that uses the statistics to generate weights or biases or both that are to be provided to the processing NN. This alone substantially reduces the size of the processing NN in number of nodes, and in turn the computational load, parameters, and operations per pixel of the processing NN, thereby enabling real-time SR on small or edge devices.

In addition, the statistics may be convolved, or otherwise combined, a number of times in a separate statistics network to obtain representative parameter statistics values used to form weights and/or biases to provide to the processing NN, thereby generating global representations that each may represent different calibrations of the entire frame or image. Since video statistics evolve slowly from frame to frame in a video sequence, this global-adaptation mechanism operates at a much lower rate than the frame rate of the processing NN. Thus, this operation need only be performed to change weight and/or bias values at a certain frame interval rather than every frame.

The slow evolving (or evolution) of the statistics over a video sequence raises a number of other advantages. Specifically, adjusting visual attributes of the output video (e.g., sharpness) based on user preference is now possible with negligible overhead. In common deep-learning systems this desirable property comes at a large price—the neural network must be made more powerful to accommodate extra flexibility. Externalizing this additional degree of adaptivity to the control flow eliminates increased load on the processing NN.

Also with regard to the statistics themselves, explicitly externalizing the adaptation into the control flow, and triggering the control flow much slower than the pixel processing flow due to the slow evolution, can enable the addition of very large-scale statistics, and access to them by the processing NN on the pixel processing flow, all without the need to estimate the statistics repeatedly within the processing NN. Thus, by adjusting the trigger rate of the control flow, the statistics NN as well as the weight engine can be made arbitrarily large (or powerful) without affecting the overall computation costs. In other words, very detailed statistical descriptions are potentially possible, and the control flow can be made more powerful without affecting the pixel throughput. If the computation demands increase, the trigger rate can be lowered to compensate. Also, this extra power can potentially improve the specialization of the processing weights which may in turn (a) improve the quality of the output video, and (b) reduce the load on of the processing NN, which is usually the bottleneck of the system.

Combining these two techniques, reducing the processing NN size and providing control parameters at intervals, reduces the computational load for SR by as much as two orders of magnitude (see Table 1 below), enabling real-time or near real-time video SR on small or edge devices.

Turning to the training protocol, in order to increase the accuracy and HR image quality, the training protocol involves mimicking natural image-capture processes by at least factoring naturally occurring blur in the images caused by camera lenses. This involves intentionally blurring the LR image according to a point spread function (PSF), which generalizes better to real-world input videos thereby substantially increasing sharpness of the HR images. PSF is a known measure of the performance of an imaging system, and specifically measures what a point of light will look like in an image, or in other words, how much a point of light will spread. Thus, the spread is a measure of how much blur each point has for a given lens.

By one form then, the system modifies an original image by using a PSF scaled by a stretch factor to generate HR training images, and by using both an upscaling ratio and the PSF scaled by the stretch factor to generate the corresponding LR training images. Other details are provided below. As a result, a deep learning model may be trained on inputs which resemble real-world images, and therefore performs well on real-world videos. A relatively sharp, good quality HR image 400 (FIG. 4) was produced by using these disclosed methods and systems. In fact, such high quality HR images may be produced by the methods described herein such that cameras may be permitted to have lower quality or lower resolution optical modules (with lenses and so forth) thereby permitting reduction in the size of such optical modules.

It also will be understood that the NN structure and hardware architecture disclosed herein may be used for image processing other than super-resolution, and the network training may be performed as disclosed herein by factoring other image conditions in addition to just PSF such as tone mapping and so forth.

Referring to FIG. 5, an example process 500 for super-resolution image processing described herein is arranged in accordance with at least some implementations of the present disclosure, and is directed to de-coupling statistics estimation and/or user preferences from an SR neural network. In the illustrated implementation, process 500 may include one or more operations, functions or actions as illustrated by one or more of operations 502 to 508 numbered evenly. By way of non-limiting example, process 500 may be described herein with reference to any of the example image processing systems described herein and where relevant.

Process 500 may include "obtain at least one lower resolution (LR) image" 502, and by one example, real-world images captured by cameras. This may be still photographs, but the system herein is particularly directed to video sequences of LR images to be converted to HR.

Process 500 may include "generate at least one high resolution (HR) image comprising inputting image data of the at least one LR image into at least one super-resolution (SR) neural network" 504. The SR neural network may be a processing NN on a pixel processing flow. The neural network is arranged to convert LR images to HR images.

Process 500 may include "separately generate weights or biases or both comprising using statistics of the LR image" 506. This may be performed rather than letting the SR neural network internally and implicitly generate statistics itself (or by treating the statistics as inputs at input nodes of the SR neural network). Thus, this operation refers to the de-coupling of a control (or configuration) flow that performs statistics estimation and a pixel processing flow operating the processing NN so that the two flows can operate in parallel so that generation and use of statistics does not increase the size and computational load of the SR neural network (also referred to as the processing NN). Now the weights, bias, or both of the processing NN can be based on the statistics instead of increasing the number of nodes on the processing NN. The de-coupling also avoids any significant latency issues. Since statistics evolve slowly over a sequence of frames, the system can generate the LR image statistics, and in turn weights or biases or both, at frame intervals along the video sequence. By one example, the interval is 10 frames. In examples, the intervals may be uniform or the intervals may be varied. With this arrangement, if the control flow is late providing new weights or biases for a target frame, the processing NN can use the latest available weights and bias for the target frame instead and without any significant drop in image quality or sharpness. Since the control flow can perform the statistics estimation process at a lower rate than the video frame rate at the pixel processing flow, this can reduce the number of operations per pixel by as much as two orders of magnitude (see Table 1).

Process 500 may include "provide the weights or biases or both in the SR neural network to be used to generate the at least one HR image" 508, where the generated weights or biases can then be provided to the processing NN on the pixel processing flow to generate HR images.

Figure 6:
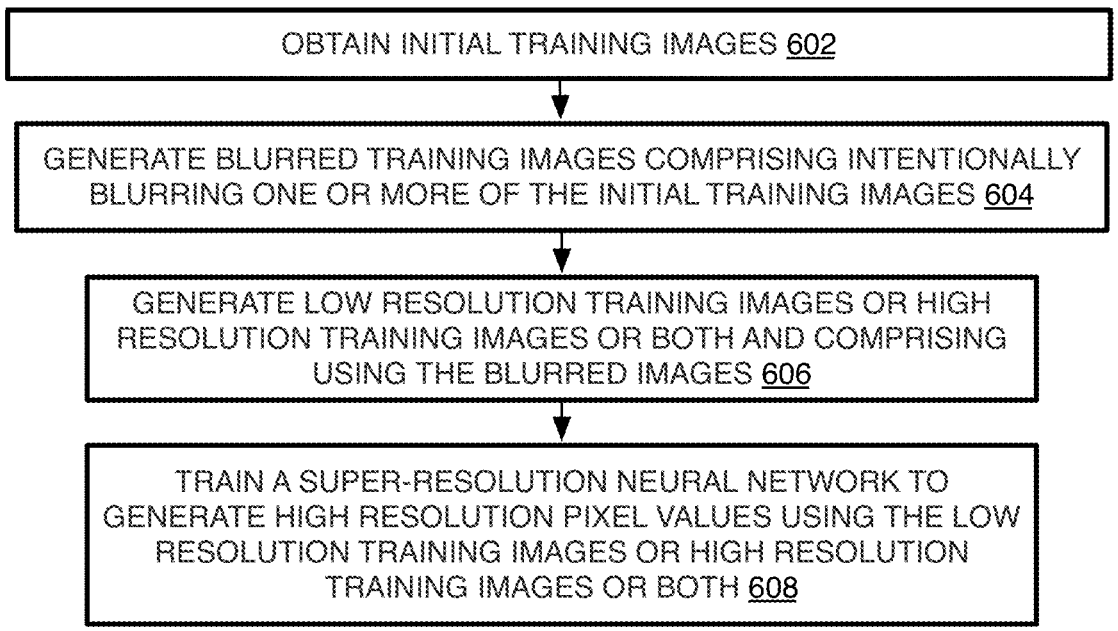
FIG. 6 is a flow chart of a training method of real-time super-resolution image processing in accordance with at least one of the implementations herein.

Referring to FIG. 6, an example process 600 for super-resolution image processing described herein is arranged in accordance with at least some implementations of the present disclosure, and is directed to generating training images to train the SR neural network. In the illustrated implementation, process 600 may include one or more operations, functions or actions as illustrated by one or more of operations 602 to 608 numbered evenly. By way of non-limiting example, process 600 may be described herein with reference to any of the example image processing systems described herein and where relevant.

Process 600 may include "obtaining initial training images" 602. These may be HR training images that are sized so that decimating the images achieves desirable smaller HR and LR training image sizes to be used to train the SR processing NN.

Process 600 may include "generate blurred training images comprising intentionally blurring one or more of the initial training images" 604. This involves attempting to simulate at least one real-world image capture condition so that the resulting trained NN better generalizes to real-world images. Here, the process concentrates on blurring but the process could additionally modify initial image data in order to simulate other camera lens and camera operation effects. Here, this operation includes obtaining one or more point spread function (PSF) values that each represent blur caused by a different lens, and then determining a stretch factor based at least in part on each PSF being used. The stretch factor compensates for the decimating of the blurred image down to desirable HR and LR training image sizes. The stretch factor then may be used to set the size, shape, and/or coefficients of a convolution kernel to be used to traverse over an initial training image input at a blurring convolution operation that will output the image data in the form of a blurred image that corresponds to the input initial image.

The SR processing neural network may be trained for a single specific PSF and specific camera lens. In other alternatives, the initial images are assigned a random PSF among a set or range of available PSFs so that the neural network can convert LR images with varying blur patterns and in turn, varying PSFs. Other variations are mentioned below.

Process 600 may include "generate low resolution training images or high resolution training images or both and comprising using the blurred images" 606. The blurred images then will be decimated to reduce them down to the desired HR training image and LR training image sizes.

Process 600 may include "train a super-resolution neural network to generate high resolution pixel values using the low resolution training images or high resolution training images or both" 608. Accordingly, the LR training image may be input to the SR neural network (or processing NN) to be trained, and the HR training image may be set as the supervised network output for the training. The neural network may be operated during training until adequate parameters are set for the neural network.

Figure 7:
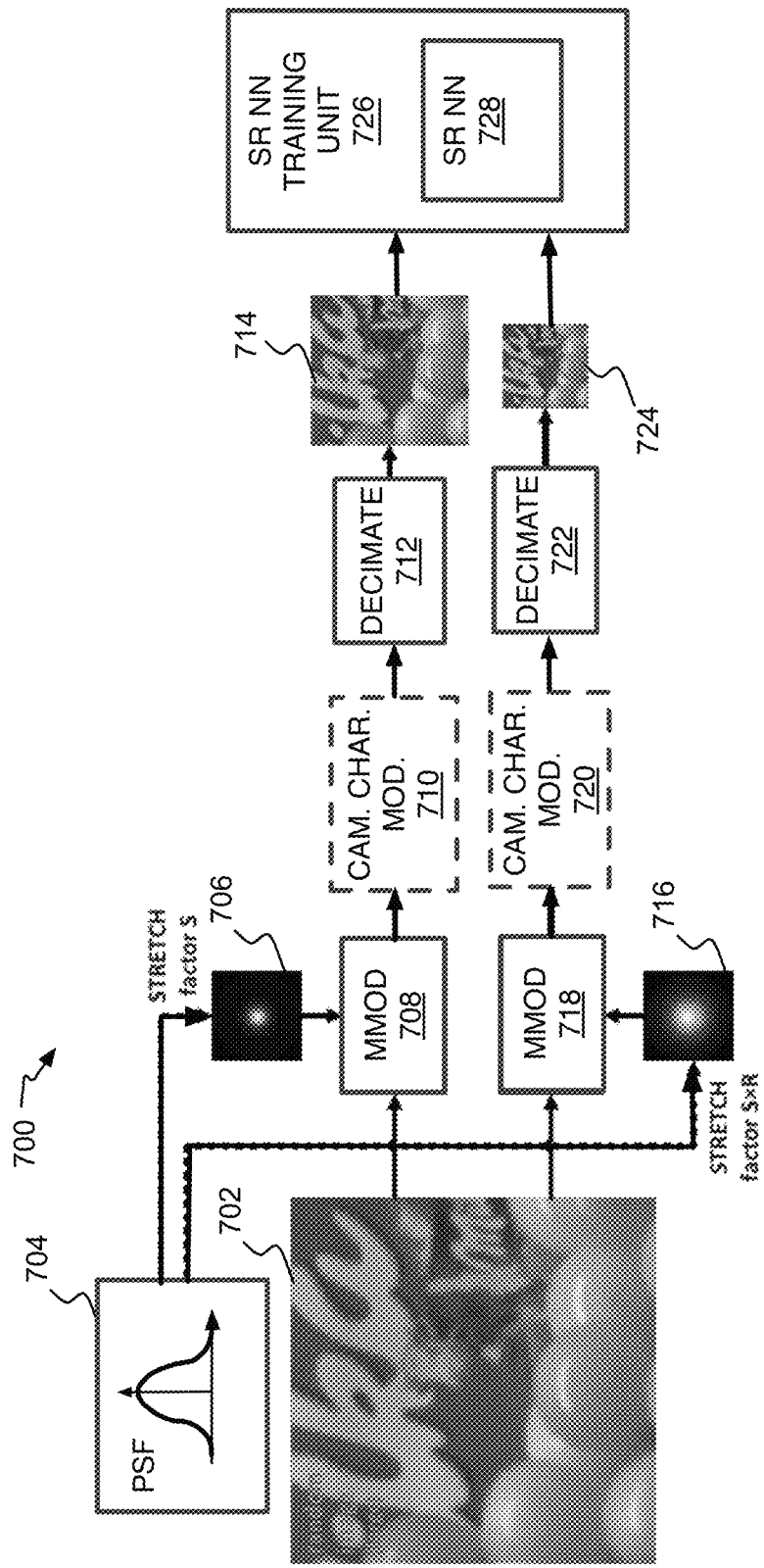
FIG. 7 is a schematic diagram of a training system for real-time super-resolution image processing in accordance with at least one of the implementations herein.

Referring to FIG. 7, an image processing system or device 700 may be used to perform training of a super-resolution processing neural network 728, and particularly to prepare images to be used as the input and supervised output of the processing NN 728. The image processing device 700 intentionally blurs the images to better generalize to real-world images captured by non-ideal cameras with flaws (or variations) at least with possible point spreads and possibly other variations such as tone-mapping, stabilization, and so forth. The image processing device 700 may receive initial training images 702 to be blurred or otherwise modified to better match real-world images so the blurred images can be used for training.

The imaging device 700 has a camera or lens characterization unit 704, which here may be a PSF unit, that provides factors or coefficients to be used to modify the images 702. By one form, PSF stretch factors, formed by stretch factor units 706 and 716, are respectively provided to LR and HR main modification (MMOD) units 708 and 718 that use the factors to modify the image data of the initial training images 702, and may operate neural networks themselves. Then optionally, one or more additional camera characteristic modification units 710 and 720 may be used to further modify the images with factors from other types of camera characteristics, such as tone-mapping, stabilization and so forth. Thereafter, decimate units 712 and 722 decrease the sizes of the blurred images to desired input HR image resolution and desired output LR image resolution to respectively form blurred output HR training image 714 and blurred input LR training image 724. The blurred images 714 and 724 then may be provided to an SR NN training unit 726 that uses the images to perform the training of the SR processing NN 728. Process 800 below provides the details for the operation of image processing device 700.

Figure 8:
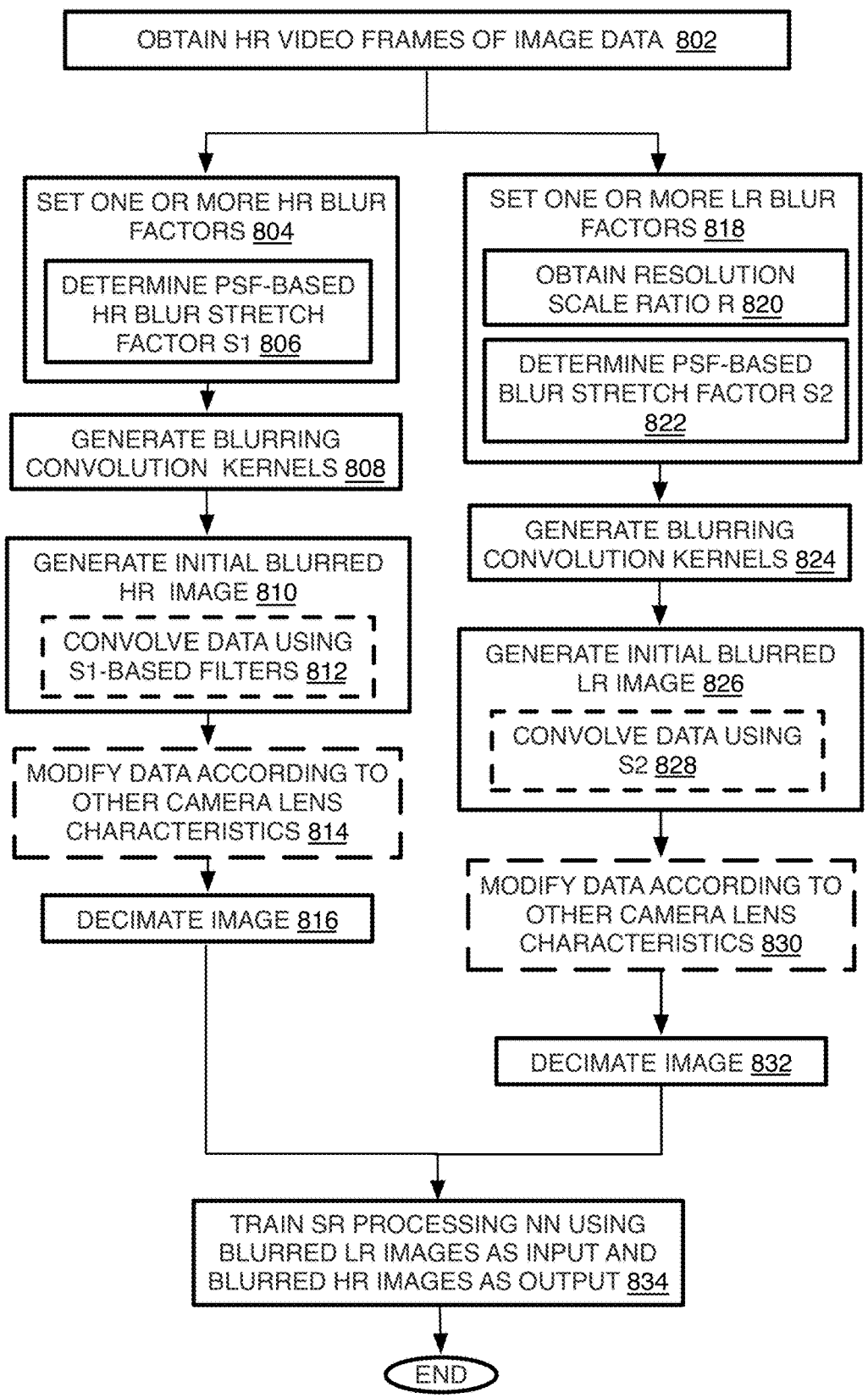
FIG. 8 is a detailed flow chart of a training method of real-time super-resolution image processing in accordance with at least one of the implementations herein.

Referring to FIG. 8, an example process 800 for super-resolution image processing described herein is arranged in accordance with at least some implementations of the present disclosure, and in particular, to generate training image data to train an SR neural network. In the illustrated implementation, process 800 may include one or more operations, functions or actions as illustrated by one or more of operations 802 to 834 numbered evenly. By way of non-limiting example, process 800 may be described herein with reference to any of the example image processing systems described herein and where relevant.

As mentioned, this process 800 includes generating image pairs including an input image and an output image with properties that are better correlated with (or correspond to) real-world, camera-captured images that are likely to be used as input to a learning-based SR model during run-time, and therefore, are more likely to generalize to real world videos. The image pairs are generated by digitally simulating analog transformations of light and camera operations while a camera captures an image. This includes simulating characteristics of a camera lens or camera capture operations that result in certain image characteristics, and in turn, affect the raw image data on a digital camera. One of the most significant characteristics is blurring of the image as measured by point spread function (PSF), and the examples herein intentionally blur the images to simulate the blurring on real camera captured images.

Process 800 may include "obtain HR video frames of image data" 802, such as initial images 702. The initial images may be sized depending on predetermined camera lens character factors (such as a blur stretching factor described below) and downscaling ratios being used so that subsequently decimating the image will result in input LR training images and output HR training images of desired sizes to train the SR neural network 728. Thus, for example, an initial image may be 400×400 pixels when a stretch or scale factor S is 4 to obtain an output HR training image of 100×100 pixels. An additional downscaling ratio R is used to obtain the input LR image size as explained below, and in this example, say R=2, so that after decimating, the input LR training image is 50×50 pixels. It will be understood that many other sizes may be used as desired. The details are explained below. This also may include training the SR neural network 728 with multiple different image sizes in the same training session.

The initial images 702 may be a variety of real-world images with varying content of any known visible subject matter and that are captured by a camera. By some form, known neural network picture collections are used specifically with pictures collected to train image neural networks and that include as many different visible views in the world that may be experienced by a person or camera. Since these are camera captured images, the initial images include lens or camera operation characteristics, such as blur from PSF. It has been found, however, that intentional image modification to factor such characteristics as performed here in the present system and method is so much more significant and impactful such that naturally occurring image data variations, such as blur, on the initial images can be considered negligible.

Also, the intentional camera character factoring operations herein apply to all channels by the fact that all light is affected, such as by blurring, by the lens. In the present system and method, however, only a luma channel is resolved since the human eye is much more sensitive to brightness than color. Thus, in the present example, the system only uses luma (or brightness or luminance) data of the initial images. By alternative forms, color channels could be blurred as well.

Process 800 may include "set one or more HR blur factors" 804, and specifically a PSF-based stretch factor S that is used to determine the coefficients and their positions to blur the image data of the initial images. By one form, the stretch factor S sets the size and shape of a convolutional kernel (or filter) when a convolution operation is used to perform the blurring of the initial images. The convolution may be operated to perform the blurring by the main modifier (MMOD) units 708 or 718.

The stretch factor S is used to compensate for the subsequent decimating of the blurred images to achieve the HR and LR training image sizes. Particularly, the decimating can be considered another form of camera characteristic simulation by sampling pixel image data by selecting and dropping pixels thereby simulating sampling by a camera sensor. This is in contrast to combining or averaging pixel values with interpolation to change image sizes as performed by typical upscaling or downscaling algorithms. This adds a further feature that imitates real-world image capture to increase the scope of generalizations of the SR neural network during run-time.

When blurring the initial images, a PSF curve or spread alone typically is not large enough to be adequately represented on a decimated image. Too many blurred pixel locations will be dropped during the decimation to form the training image. Thus, the PSF spread is first spatially stretched in pixel area by the stretch factor S to form a convolution kernel before convolution so that a blurred, subsequently decimated image still will have a sufficient amount of blurred pixel image data to adequately represent the blurring.

Accordingly, this operation may include "determine PSF-based HR blur stretch factor S1" 806. Thus, as a preliminary operation to setup the image blurring units 708 or 718, the system may obtain specific PSFs that are going to be used to compute the stretch factor S. By one form, the SR NN 728 may be trained for a specific camera with a specific lens arrangement such that only one specific PSF value need be obtained. In this case, the SR model or neural network may be trained to expect images originating from a specific imaging device.

In alternative forms, the SR neural network may be more adaptive for a number of different cameras and may be trained to convert images to HR for multiple cameras, and in turn, associated with multiple different PSFs. In these cases, PSFs of a number of camera lens devices may be represented either by using PSFs in a range of PSFs or by using PSFs in a set of specific known PSF values that are associated with camera lenses or specific cameras. The PSF also may be set at, or include, non-real values to include a greater variety of PSFs. It also should be noted that the PSF also can vary or be kept constant while other camera parameters are varied in addition to the shape and size of a lens, or combination of lenses. By one example, these parameters may be related to different lighting conditions and may include variations in noise or tone-mapping. While these variations may be controlled to provide a certain number of input images for certain variations, by another approach, the variations are random so that PSF may be better detected in random samples.

In one alternative with multiple PSF representation, a random PSF within a range or set of the PSFs as mentioned can be used for each image pair, and the SR model would be trained to expect a variety of real-world images with varying PSFs in this case. Thus, each image pair may be based on a different PSF. By another example, the same initial image may be added to the training set multiple times so that each blurred image pair from the same initial image is based on a different PSF. Different lighting conditions also can be a variable within the input images.

Another way to describe PSF in addition to those mentioned above is that PSF is a quantitative measurement of how each infinitesimal point of light in the scene is spread on the sensor plane. The point spread is typically associated with a Gaussian curve so that the image pixel pattern of the spread (or smear) on an image is usually circular although non-uniform usually with intensity decreasing with increasing distance from the center or most intense pixel. The pattern, however, need not always be in the form of a perfect circle on an image, and the spread (or smear) may have many different shapes and areas. The actual blurring convolution kernel (or filter) used may be rectangular, circular, or other desired shape to match the top view of the actual PSF curve for example. For the present ongoing example, assume the PSF has a characteristic blur that covers a 3×3 pixel area, where a point light-source in the real world gets smeared onto a 3×3 region of a camera sensor. This is a very simplified version for explanatory purposes.

Now to determine a free parameter or stretch factor S1 for the blurred HR image, the X and Y dimensions of the PSF (or PSF pattern) are multiplied by the stretch factor S1 to generate a stretched size of the pattern to be the CNN kernel (or filter). The larger the factor S (or here S1), the more gradual the gradation of the spread, the closer the values will be to the PSF curve, and therefore the closer the simulation will be to an actual image capture. If S is too high or too low, the resulting image becomes too unrealistic and proper generalization will be reduced. Also as mentioned, S is factored into the decimation scale. Thus, the initial image dimensions (X and Y) will be divided by S to obtain the decimated blurred HR image dimensions as explained in greater detail below.

To simplify, the association between a PSF value and the stretch factor S may be determined by using an input image of say 400×400 pixels which is very dark except for one bright point. The point is smeared using the spatially stretched PSF. Assume the original smear is 3×3 pixels, and S=4 is being tested. The stretched smear pattern is now 12×12 pixels (the original smear of 3×3 times the stretch factor S). The bright point is now considered stretched to 12×12. The system is then tested and S is varied until the results are adequate. Since, the PSF defines how an infinitesimal point in the scene gets spread on the imaging plane (the sensor), it is defined as the percentage of light-energy as a function of the radius (or in other words, the distance from the center, and therefore the PSF can be stretched an amount to scale this radius so that the light or blurring reaches farther outward and the smearing is "more severe".

Once the blur or stretch factor(s) S1 are set, then process 800 may include "generate blurring convolution kernels" 808. Here, Given a point-spread function PSF(x,y) and input image In, PSF is stretched to create a candidate convolution kernel:

$$h(x,y)=PSF(x/s,y/s) \quad (1)$$

where h( ) is a kernel, (x, y) is a pixel location on the image, PSF( ) is the PSF function or curve to graduate or blur the light, and s is the stretch factor. This will set a maximum intensity according to the PSF with reducing intensity levels with each pixel distance from the maximum intensity pixel within the kernel and according to the curve of the PSF. The kernel then may be tested to determine the generalization for training and whether adequate sharpness has been achieved. This is repeated for each PSF being used and each desirable S value for that PSF. This is performed separately, prior to the processing NN training, to determine the correct PSF-stretch factor association, kernel size, and kernel coefficients that is to be used to blur the initial images and as performed by stretch factor units 706 and 716. Once the stretch factor S1 and the blurring convolution kernel size, blurring kernel shape and size, and blurring kernel coefficient magnitudes are set within the blurring kernel by the stretch factor unit 706, the main modifier (MMOD) unit 708 is ready to perform blurring convolution to blur the initial images to form the HR training image (the operation for the LR image is described later below).

Process 800 next may include "generate initial blurred HR image" 810. Here, the kernel may be moved over an image with a stride determined during training, such as by 1, and may be moved in raster order for example, so that each pixel location in the image is modified by the blurring convolution, and as mentioned may be a single convolution layer, and operated by the MMOD unit 708. The kernel may be placed over the image by placing each current pixel to be modified at a center position of the kernel or other specific pixel position within the kernel.

This operation then may involve "convolve data using S1-based filters" 812, where each coefficient in the kernel is multiplied by a corresponding initial image pixel value. Thus, to blur the image by convolving with h:

$$I_{conv}(x,y)=(I_{in}*h)(x,y)=\Sigma_{m,n}I_{in}(n-x,m-y)h(n,m) \quad (2)$$

where $I_{conv}(.)$ is a convolved pixel of image data formed on a convolved and now blurred layer or blurred image, and (n, m) is the coefficient positions within the kernel. The equation determines the product between a pixel location on the image and a corresponding kernel coefficient. Then, each product is then summed to form the new value for the current pixel. This is repeated for each pixel location (x, y) to factor blur into the individual pixel values. It will be noted that the convolution equation (2) and kernel treats each pixel location independently and uses the initial image data so that a resulting blurred value of one pixel location is not affected by a resulting blurred pixel value of another pixel location.

It also should be appreciated that this convolution operation does not change the resolution of the initial image. Thus, a 400×400 pixel initial image will still be 400×400 pixels on the blurred image directly after the convolution operation. Also, pixel locations at the outer edges of the initial image where a full kernel does not fit on the image will have a missing kernel size area filled in by known techniques such as mirroring or other techniques.

Process 800 may include "modify data according to other camera lens characteristics" 814. In order to simulate even more realistic image capture, camera character modification units 710 (and unit 720 for the blurred LR image as described below) may modify the blurred image data even more. Thus, while the blur is the minimum camera characteristic factoring transformations that can be performed, further image data modifications can be performed for other common image transformations such as with tone-mapping, additive sensor-noise, stabilization, and so forth. These are known image modifying algorithms. This will further increase the likelihood of generalization.

Process 800 may include "decimate image" 816, as performed by the decimate unit 712 for example, and to digitally simulate sampling by the camera sensor as mentioned above. The blurred image is then decimated by the HR stretch factor S1. By one example, the blurred image is then decimated by:

$$I_{down}(x,y)=I_{conv}(x*ds,y*ds) \quad (3)$$

Specifically, the decimating removes pixels without interpolation, or in other words, without combining pixel values or generating pixel data combinations such as averaging. In one form, the decimating avoids any interpolation or pixel value combinations. The decimating keeps pixel values at an interval set by the stretch factor S1 and drops any other pixel. This is performed in both X and Y directions, although a different decimating pattern could be used.

Thus, by one example, when S (or S1) is 4, the decimating will only keep every fourth pixel in each dimension. By one example, if the initial and blurred image is 400×400 pixels and S=1, then the decimating will generate a 100×100 pixel HR training image. The resulting image is then 'S' times smaller than the initial image. The blurring process may be represented as:

$$W \times H \rightarrow \hat{a} \text{ CONV with } S \rightarrow \hat{a}W/S \times H/S \quad (4)$$

where W×H is the width and height of the initial image, à CONV is the convolved or blurred image, S is the stretch factor described above, and a W/S×H/S is the resulting decimated image. The resulting image resembles images that have been captured with a lens characterized by the specific PSF that was used to blur the image. The blurred HR training image 714 is then made available by placing it in a training set of images to be used to train the SR NN 728.

Turning now to generation of the blurred LR training image, process 800 may include "set one or more LR blur factors" 818, and this process is similar to operation 804 described above for the blurred HR training image, except here this operation also may include "obtain resolution scale ratio R" 820. Specifically, in order to prepare image-pairs for training a learning based SR model (or NN 728), two image capture simulations are performed with the same PSF but with different stretch S values. As described above for the blurred HR training image, S1 is a direct expansion of the PSF. For the blurred LR training image, however, a stretch factor S2 is based on the PSF and an upscaling ratio R that is part of the SR model. Particularly, the output of the blurring operations is two representations of the same scene at different scales with ratio R between them where the smaller of the two images serves as input during training, and the larger serves as the HR "label" or output image to form a supervised network. Thus, the SR NN is being trained to upscale an LR image by the factor R.

Thus, process 800 may include "determine PSF-based blur stretch factor S2" 822, where $S2=S_L \times R$, and by one example form, $S_L=51$. Otherwise, the determination of PSFs to be used and then determining the stretch factor S2 based on the PSF is the same or similar to that of S1. By one form, ratio R may be 2, but in other examples is often 2 to 4, where up to 8 has been used also, but no limitation exists here except that in one example R is a rational number larger than 1.

Process 800 may include "generate blurring convolution kernels" 824, and once S2 is computed, this operation is the same or similar to the HR blurring convolution kernel forming operation 808, except here it may be performed by the LR stretch factor unit 716.

Process 800 may include "generate initial blurred LR image" 826, and this operation includes "convolve data using S2" 828. These operations run the blurring convolution and apply the kernels to the initial image data similar to HR operations 810 and 812, except here these operations may be performed by the MMOD 718.

Process 800 may include "modify data according to other camera lens characteristics" 830, and this may be performed by camera characteristic modifier unit 720 as with unit 710 already described above.

Once a blurred image is generated (and with or without other modifications as mentioned), process 800 may include "decimate image" 832, and as may be performed by the decimate unit 722. The upscaling ratio R also is used to generate an LR image smaller than both the initial image and the blurred HR training image. Here, the LR blurring process may be represented by:

$$W \times H \to à \text{ CONV with } S2 \to à W/(S2) \times H/(S2) \quad (5)$$

Referring to the continuing example from the blurred HR training image generation, assume that S1=4, R=2, and S2=(4×2)=8. So if the initial images are 400×400 pixels, and the blurred HR training image is 100×100 pixels, the blurred LR training image will be 50×50 when S2=8. The result is a blurred LR training image 724 that can be used to train the SR NN 728 as part of an image pair with a corresponding blurred HR training image 714.

The blurred LR training image may be added to the training set, stored in a memory, and corresponded to the blurred HR training image to form the image pair.

Process 800 may include "train SR processing NN using blurred LR images as input and blurred HR images as output" 834, and as may be performed by SR NN training unit 726. The pairs of blurred LR and HR training images 714 and 724 then may be used to train the SR NN 728 by using the blurred LR training image as input and the blurred HR training image as supervised output. Once sufficiently trained, the SR NN will provide good generalization and may be used during a run-time to convert real-world LR images to HR images with high quality images with very good sharpness.

Figure 9:
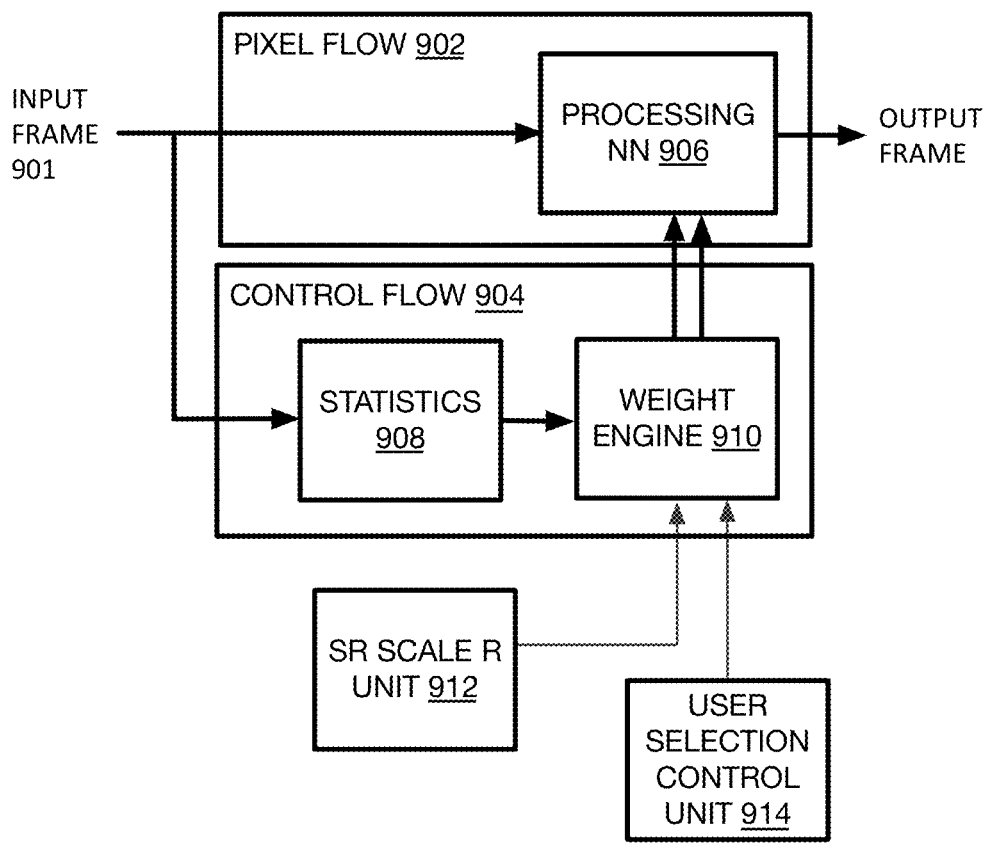
FIG. 9 is a schematic diagram of a run-time system of real-time super-resolution image processing in accordance with at least one of the implementations herein.

Referring to FIG. 9, an image processing system or device 900 for performing super-resolution has two parallel flows that both receive the same input frames 901: a pixel processing flow unit 902 and a control (or side or configuration) flow unit 904. Each flow unit 902 and 904 operates in parallel so that the pixel processing flow unit 902 does not need to pause and wait for significant amounts of time, if any, to retrieve data from the control flow unit 904. The pixel processing flow unit 902 has a processing neural network (NN) 906 that may have been trained by any of the training methods described herein, while the control flow 904 has a statistics unit 908 that generates (or estimates) a statistical representation of an image and a weight engine 910 that uses the statistics. An SR scale R unit 912 provides a scaling ratio between the input and output images to the weight engine 910, and a user selection control unit 914 provides user selection values to the weight engine 910. The weight engine uses these values to generate weights and/or biases for the processing NN 906.

The parallel operation of the two flows 902 and 904 is performed by hardware or firmware that depends on the target platform. Thus, by one example, each flow may have its own image signal processors (ISPs), graphics accelerator, or graphical processing units (GPUs) including any multiply-accumulate (MAC) circuits, and so forth. In this case, the control flow 904 can be computed on a separate low power computing circuit (or processor(s)), freeing up resources of the main processing device (e.g., GPU or HW accelerator). This may even include performing the control flow on a separate remote device such as a server via wireless connection over the internet by example. By another form, both flows may share the same hardware by context-switching, for example.

Due to the relatively small size of the processing NN as described below (FIG. 11), the processing time should be shorter than a time interval between frames, which should leave adequate time for the control flow operations as well.

Even though the pixel processing flow and control flow operate in parallel, latency in the output of the control flow is not a serious concern because the statistics evolve slowly over many frames in a video sequence. In other words, and relative to the speed of the control flow operations herein, image content usually changes relatively slowly from frame to frame (except at a scene change) so that the same single image statistics may remain relevant to a long run of consecutive frames (whether 10 or 20 frames or other number of frames depending on the content and to name a few random examples). Thus, if the output of the control flow arrives too late to apply to a target frame corresponding to an input LR frame used to form the statistics, it does not significantly affect the system to simply apply the output of the control flow to the next available frame within a certain number of frames from the target frame along the video sequence, such as within 10 frames by one example. The operation of system or device 900 is provided with process 1000 below.

Figure 10:
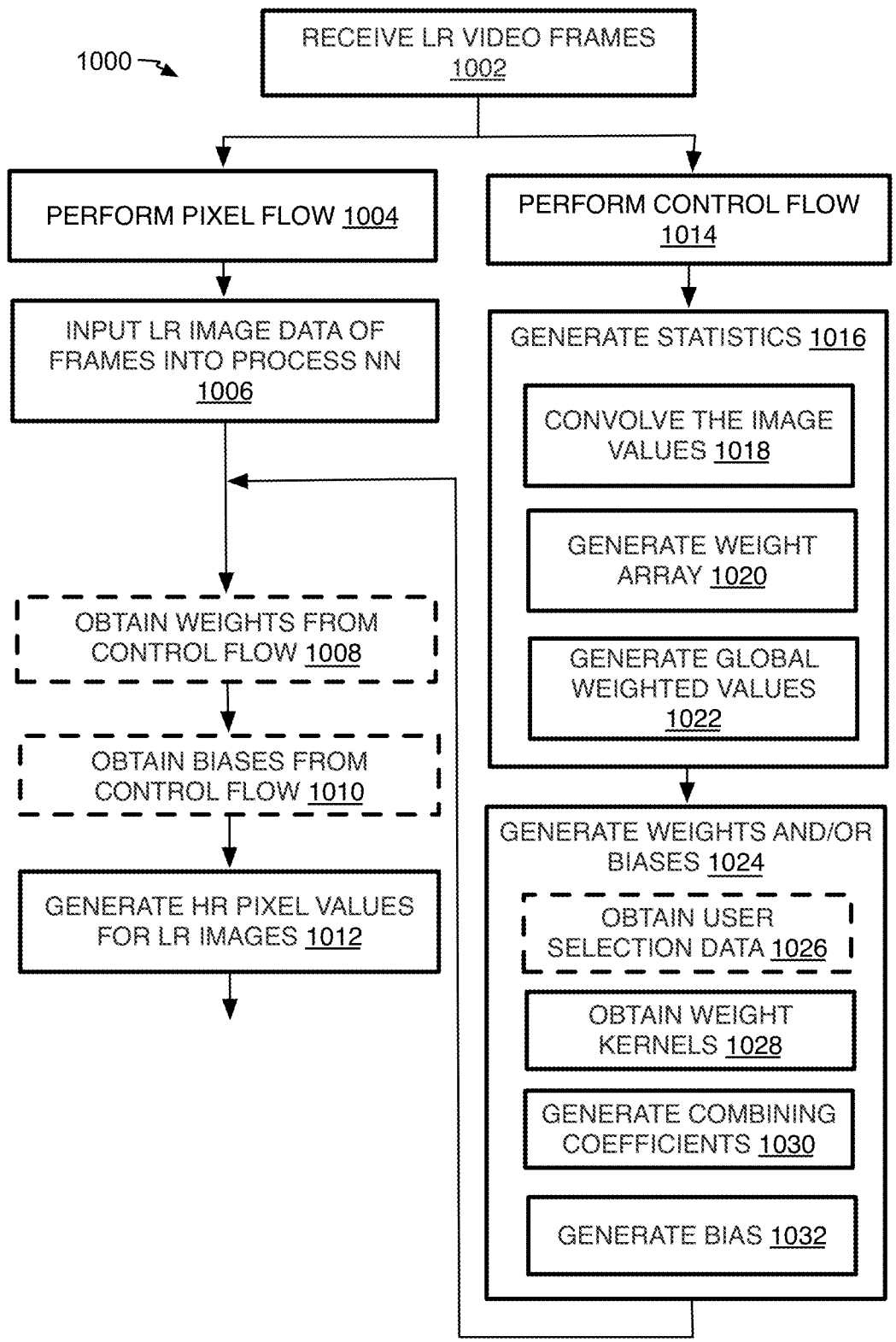
FIG. 10 is a detailed flow chart of a run-time method of real-time super-resolution image processing in accordance with at least one of the implementations herein.

Referring to FIG. 10, an example process 1000 for super-resolution image processing described herein is arranged in accordance with at least some implementations of the present disclosure. In the illustrated implementation, process 1000 may include one or more operations, functions or actions as illustrated by one or more of operations 1002 to 1032 numbered evenly. By way of non-limiting example, process 800 may be described herein with reference to any of the example image processing systems described herein and where relevant.

Process 1000 may include "receive LR video frames" 1002. In one example, one or more cameras or image sensors may provide captured image data of LR input images 901 and that is provided to one or more processors as described with device 900. The image data may be obtained directly from the sensor or may be retrieved from any memory or storage that is holding the image data. This operation also may include any pre-processing of image data to prepare the data to be used to perform super-resolution and may include operations other than statistics generation for super-resolution described below. It will be appreciated that instead of video frames the following process could be applied to individual still photographs instead.

The input LR images 901 to be converted to HR may be real-world images captured by one or more cameras. The LR images may include expected point spreading with sizes and magnitudes depending on the camera lens arrangement as well as camera operations, as described herein. The images may be any size, and particularly those image sizes of the training images used to train the SR NN, and by one example, for 1080p displays.

As mentioned, two separate parallel flows are performed so that statistics generation does not become a bottleneck for the neural network processing that generates HR values for an input LR image. Thus, the de-coupling of the statistics estimation from the pixel processing may begin by providing the LR images to both the pixel processing flow unit 902 and the control flow unit 904. The pixel processing flow 1004 processes the input pixels to produce super-resolved (or upscaled) video frames (or output HR images).

The pixel processing flow operations 1004 may include "input LR image data of the frames into processing NN" 1006, which may be the SR processing NN 906. This may include retrieving the LR image data from memory or one or more camera sensors and placing the image data in input buffers of the processing NN, thereafter to be placed in registers of an ISP, GPU, and specifically of an MAC by one example. The LR image data may be placed into buffers, and in turn, input nodes, a vector, matrix, or tensor at a time.

By one example form, the input to the statistics CNN is an image of size WoxHoxCo, where W is width, H is height and C is the number of channels. Initially, C0 is likely to be three for three color channels of an RGB image.

The arrangement for organizing the input data at the input nodes of the processing NN is not particularly limited except to state that the input LR images are not modified yet by SR statistical representations, such as global weighted values, generated by the control flow specifically for super-resolution. The statistical values also are not used as input at input nodes of the processing NN either. Similarly, when user preferences as described below are obtained, the user preferences are not used to modify the image data, and are not input to input nodes of the processing NN. The externalizing of this data forces the neural network to avoid additional and unnecessary network operations directed to adapting the processing to the signal's large-scale statistical properties or user preferences, and repeatedly for each pixel in each frame. Thus, this results in a small neural network with a relatively small computational load, and small power consumption, thereby substantially increasing the speed of HR image generation so that real-time (or near real-time) operation can be achieved on small or edge devices.

Process 1000 then includes obtaining (1008, 1010) weights and/or biases from the control flow 1014. So before explaining these operation, the parallel control (or configuration) flow 1004 will be described first.

Process 1000 may include "perform control flow" 1014. The control flow can be considered a configuration flow that configures the processing NN. This refers to the control flow providing parameters such as weights in the form of a convolution kernel to be traversed over the LR images input to the processing NN. This also may refer to bias values provided to the processing NN. Thus, the control flow provides parameters so that the processing NN can be configured, and so that the processing NN is adapted to current statistical properties of the input LR images and/or to user preferences.

Process 1000 may include "generate statistics" 1016. In the control flow 904, the input video frame is fed into an example statistics NN 1100 (FIG. 11) that may be operated by the statistics unit 908 for example, which may be arranged to output an encoding of frame-wide statistics. Particularly, the weights and biases used for processing the pixels are highly specialized for the current input statistics and/or the user preferences. Thus, the processing NN may be focused only, or mainly, on local image features and needs far fewer resources than conventional CNNs used for image and/or video super-resolution. Separately, the statistics unit 910 generates global statistics, and specifically, a vector of global weighted averages that represent an entire image. This results in the advantageous situation where the local processing engine (the processing NN) has access to external global information, which would otherwise not be available, and which results in attaining higher-quality processing.

Figure 11:
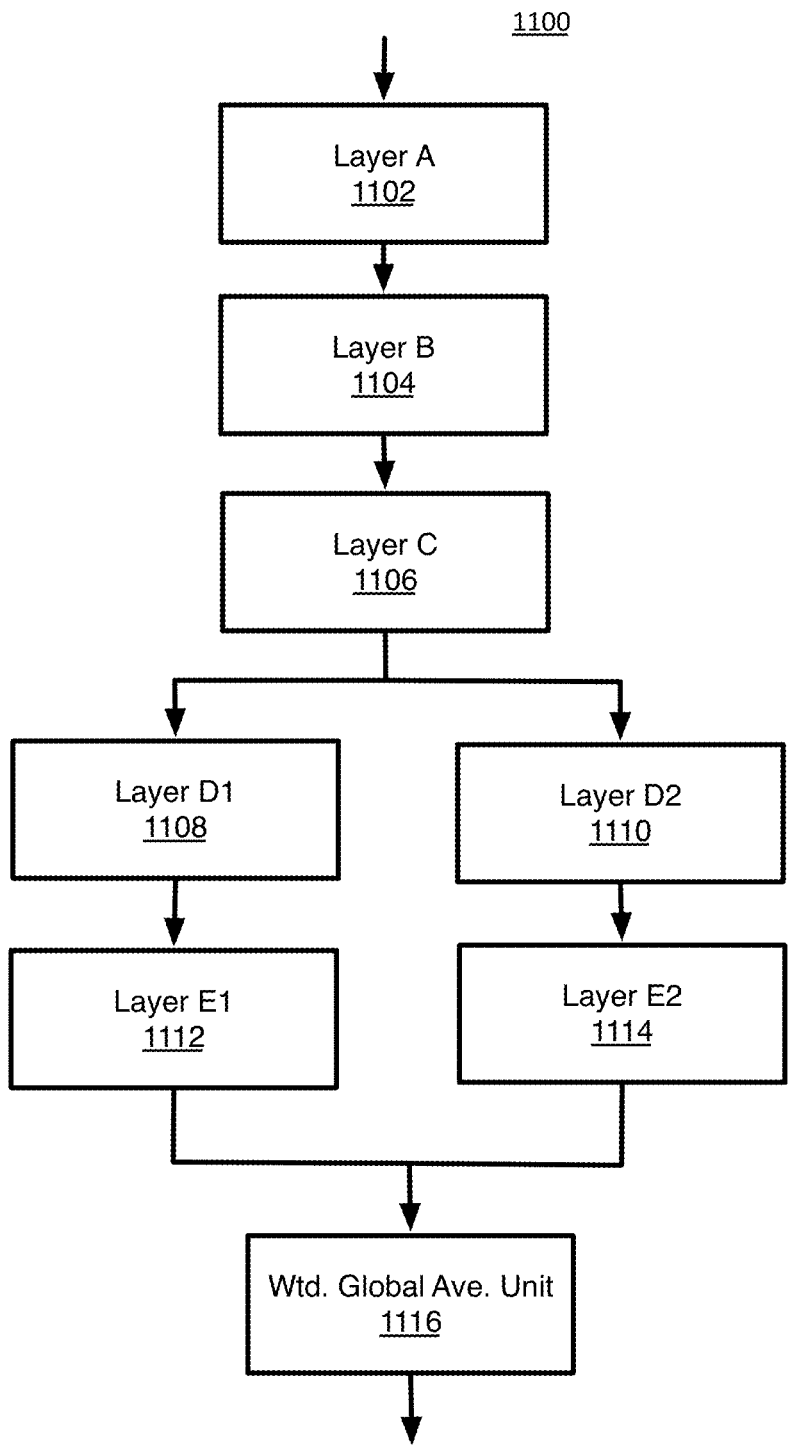
FIG. 11 is a schematic diagram of a statistics neural network for a run-time method of real-time super-resolution image processing in accordance with at least one of the implementations herein.

Referring to FIG. 11, the statistics unit 908 may operate the statistics neural network (NN) 1100, which may be a CNN. Thus, the statistics generation 1016 may include "convolve the image values" 1018. The arrangement of the NN 1100 produces a global weighted average vector representation characterizing the entire frame. The input LR image is propagated through several convolutional layers from layer A (1102) through layer E2 (1114), numbered evenly. By one approach, each layer performs a convolution. This may be multiplication with a filter (or kernel) moved along the image, where in each location, the products are summed to have a single convolution value. Either the single convolution value replaces the current image value or last convolution value, which maintains the array size, or the convolution value replaces all of the element pixel positions within the kernel thereby reducing the size of the array for the next layer.

Each layer may have an activation function, such as rectified linear units (ReLUs) or sigmoid. The weights and bias for the activation function in the statistics CNN may be determined by training. The dimensions of each layer, size and stride of the kernels, and other specifications of the layers may be set and refined during the training of the system. By one example form, for an image of 50×50 pixels, the kernels would be 3×3 pixels.

Process 1000 then may include "generate weight array" 1020. Particularly, the topology divides into two branches including a weight branch with layers D1 (1108) and E1 (1112), while the other branch is a value branch that continues the convolutions as with the earlier layers A to C (1102 to 1106). The weight layers have the same design as the value layers but are used as weights later.

The two parallel branches, each a small feed-forward topology, maintain the same output sizes as the other branch. At the output of the last layers E1 (1112) and E2 (1114), the end of the values branch E2 may designate the image (or array) V(x, y, c) where x is in the range 1, ..., $W_{final}$; y is in the range 1, ..., $H_{final}$, and c is in the range 1, ..., $C_{final}$, and where $W_{final}$, $H_{final}$, and $C_{final}$ do not necessarily have the same magnitudes as the initial $W_0$, $H_0$, and $C_0$. W and H can vary from layer to layer in the statistics CNN 1100 as desired and determined by experimentation and training.

Also, while the input LR image may be input to the statistics NN in a single channel, such as of brightness values, it has been determined (or assumed) that the statistics network implicitly develops multiple channels $C_{final}$ that each appears to encode a different global property of the image that is used for calibrating the processing NN and results as one of the outputs of the statistics network, and in turn an element on the output statistics vector. One or more channels may be a measurement of the noise level, one or more other channels may be a measure of the width of the PSF, another one or more channels may be provided for tone mapping and so forth. Thus, by one possible example, a resulting global weighted value vector S(c) may contain calibration channels $C_{final}$=8 elements, each element being a measurement accumulated over the entire frame. Many other numbers of channels could be provided instead. Thus, the content of the statistics vector may be determined during the training of the entire system, based on which dynamic properties are being varied while training the system including the processing NN, where the system is trained by varying PSFs, as described above, and noise levels. The system "learns" that this is the global information (as factored into weights and/or biases to be provided to the processing NN) that is being used to configure the processing NN effectively. Thus, the statistics NN can be arranged, by training, to implicitly provide a certain number of final channels each of a specific calibration type. An adequate number of output nodes, each most likely to be an output for an implicit channel, can be determined by trial and error. Here, eight outputs has been determined to be adequate.

At the end of the weights branch at the output of layer E1 (1112), the output image (or array) W(x, y, c) is the same size as on the output of the value branch. In the examples, if $C_{final}$=8, the result is eight pairs of arrays (value and weight) of the same size.

Process 1000 then includes "generate global weighted values" 1022. Now, the last array (or feature map) from the last value convolution layer E2 (1114) is weighted by the weight array from the last weight layer E1 (1112). Particularly, each pair of two-dimensional array of values including the last weight layer E1 (1112) array and the last value layer E2 (1114) array is combined to produce a single "global" value, which characterizes the entire frame. By one form, this combination refers to weighted averaging according to:

$$S(c)=\text{sum}_{xy}(V(x,y,c)*W(x,y,c))/\text{sum}_{xy}(W(x,y,c)) \quad (6)$$

where each value V is multiplied with its corresponding weight W. Then, all of the products are summed over all pixels (or over all elements in the last array). The sum is then divided by the sum of all of the weights in the weight array to compute the weighted average. When W and V represent the entire image, this is a global weighted average. Note that each channel may be averaged separately so that the output is an independent average for each channel, by one example form. The channels together form the output global weighted averaging vector S(c).

By other alternatives, the averaging could be computed in other ways where all of the elements in an array are averaged to obtain a single value that represents (or characterizes) the array. In this approach, for example, all of the elements of the value array from layer E2 (1114) are averaged to generate a single representative value. The weight array from the last weight layer E1 (1112) is averaged similarly to generate a single weight from the elements of the last weight array. The single value is then multiplied by the single weight to generate a global weighted average for the pair of arrays. Also, it will be understood that other combinations than averaging could be used here such as mode, median, and so forth, or other algorithms such as interpolations whether among the elements in the same array (value or weight array or both), or between corresponding elements from the two arrays (value and weight). Many variations are contemplated.

By one example, a pair of arrays is produced for each channel C. Thus, when $C_{final}$=8, the statistics CNN may compute eight weighted global values for the output global weighted value vector. Thus, in this example, an entire frame may be characterized by eight numbers (or other desired number as explained above), each being determined from the entire frame. Since the resulting global vector characterizes the entire video frame or scene, this operation is an encoding of the statistical properties of the frame; it is not a map of values per pixel (or map of groups of pixels). It will be appreciated that other numbers of pairs may be used depending on which calibrations are desired as mentioned above.

Once the statistics vector is generated, process 1000 may include "generate weights and/or biases" 1024, and by the weight engine 910 for example. In other words, one role of the weight engine is to supply the bias and/or convolution kernels of weights to be used by the processing NN to process the video frames. In addition to the statistics, the weight engine may receive (or have) an upscaling ratio R from the SR scale R unit 912 and user selection values from a user selection control unit 914.

This operation may include "obtain user selection data" 1026 when so provided. The user selection values may represent a desired sharpness value set automatically or manually by the user on a menu or interface for example. The sharpness values may be one from within an expected range of sharpness values. The user selection control unit 914 may provide a single value from the range.

Process 1000 may include "obtain weight kernels" 1028 where initial weights are generated by training the processing NN by known methods. In one approach, process 1000 also may include "generate combining coefficients" 1030 in order to factor a variety of parameters and various parameter levels. Specifically, one way to produce the convolution weight kernels is to combine several kernels based on the statistics and/or user preferences. For a simplified example, assume statistics are encoded as a single current statistic number (alpha) a in the range between 0 and 1 and may be one of the statistic value elements from the statistics vector output from the statistics unit. The combined kernel then can be computed as:

$$\text{ker}_{process} = \alpha \cdot \text{ker}_1 + (1-\alpha) \cdot \text{ker}_2 \qquad (7)$$

where the '·' operation is dot product since $\text{ker}_1$ and $\text{ker}_2$ are two alternative convolution kernels, each being a matrix of weights, and that each were generated by using a different variety of the parameters or parameter values in different runs while training the processing NN. Here, the statistics "choose" which of the options is appropriate for the current input image. Thus, for example, if alpha is close to zero (e.g., low noise), the system uses more of kernel 2, and if alpha is high (e.g., high noise) and close to 1, the system uses more of kernel 1 (and, of course, the combinations in-between).

Again, equation (7) is simplified for a single statistic value rather than a full vector of the values as output from the statistics unit.

In the current process 1000, however, and as mentioned above, a global weighted value vector of statistics is provided to the weight engine 910. The weight engine 910 may have a large collection of convolution kernels $\text{ker}_{ij}$, and may operate a fully connected neural network (FCNN) that controls combinations of the kernels. The statistics vector and the user preference(s) values are the inputs to the FCNN. The output of the FCNN are the coefficients (a) used to linearly combine the convolution kernels.

In the example equation below, coefficient $\alpha$=FCNN (statistics vector, user preference vector):

$$\text{ker}_j = \Sigma_i \alpha_{ij} \text{ker}_{ij} \qquad (8)$$

where i is the frame number, and the mixed convolution kernel $\text{ker}_j$ is then used as the weights in the $j^{th}$ convolution of the processing NN. The convolution kernels $\text{ker}_{ij}$ can be trained initial parameters (weights) of the deep-learning system, and generated while training the processing NN as mentioned above. Here, however, many kernels, each based on different combinations of parameters and parameter values, may be combined.

Process 1000 may include "generate bias" 1032. A similar mechanism can produce bias values as well. Specifically, the bias is generated by obtaining the previous bias and an expected bias, and then determining the combination coefficients in the same or similar manner to that of the weight kernels. The initial bias values are set by training as well.

It will be appreciated that the control flow may generate the weight kernels alone, the bias alone, or both.

Thereafter, returning to the pixel processing flow 1004, process 1000 may include the operations to "obtain weights from control flow" 1008, and "obtain biases from control flow" 1010. The information bandwidth between the two flows is considered negligible. As mentioned, the slow evolving of the statistical properties in a video stream are leveraged to perform the estimation process at a lower rate than the video frame rate, thus reducing the number of operations per pixel. This enables the system to trigger the configuration or control flow at a lower rate than the frame rate (e.g., every 500-1000 milliseconds). Any expected latency in the computation of the configuration can be tolerated without much effect on the output video (again, due to the slow evolution of the statistics). By one approach, the control flow may be triggered at intervals as the lower rate (lower than the frame rate) such as every $10^{th}$ frame by one example.

The de-coupling of the configuration generation from the pixel processing flow, and in turn the frame rate, and the slow evolving of the statistics also makes latency in the control flow a very minor issue. Specifically, assume the system triggers the control flow every $10^{th}$ frame. The parameters of the processing NN are then updated from the control flow at frames 1, 11, 21, . . . and so forth. If the control flow has a latency of two frames, i.e., the output of the control flow is only ready two frames later than a corresponding target frame, the processing NN in the pixel processing flow is updated anyway but now the updating is simply switched to frames 3, 13, 23, and so forth. In other words, the difference frame to frame for those 10 frames can be considered negligible for super-resolution purposes, and for the most part, the difference in the output video will be negligible. For SR operations and real-world images, such slow evolving of the image content is considered to occur up to some maximum number of frames, such as for typical frame rates, such as 30 fps or 60 fps, for example, and that can be determined with experimentation, and of course which also may vary depending on the video content.

Note that when a scene change occurs along a video at a time when the control flow configuration values are delayed, the pixel processing flow may be operated in a number of different ways. First, the scene change may be ignored and the first few frames (1 to 5 by one random example) of the new scene, for example, may use the incorrect weights and/or biases most likely without notice by a user viewing the images. Otherwise, a scene change detection mechanism may be provided that compares consecutive frames, and a scene change is detected when the comparison fails a criteria such as a maximum acceptable image-wide sum of absolute difference (SAD). By this option, the pixel processing flow may pause, and in this example only for this situation, to permit the control flow to catch up and provide the corresponding weights and biases for a frame of a new scene. By yet another option when a new scene is detected, the control flow does not provide updated weights and/or biases, and the processing NN will keep operating subsequent frames with the last received weights and biases until the control flow has the opportunity to process weights and/or biases of a frame of the new scene. Many other algorithms to detect a scene change may be used.

Figure 12:
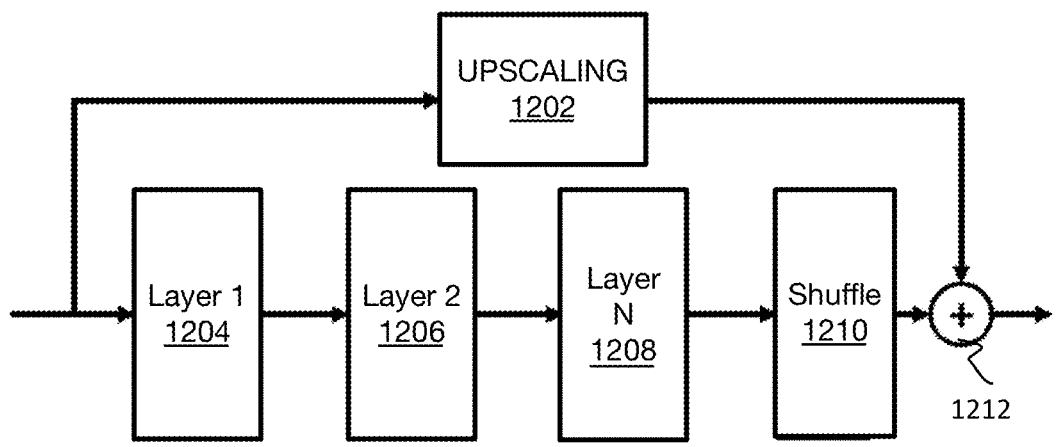
FIG. 12 is a schematic diagram of a super-resolution neural network in accordance with at least one of the implementations herein.

Referring to FIG. 12, process 1000 may include "generate HR pixel values from LR images" 1012. This involves using the weights and/or bias values from the control flow to run the processing NN. This may involve placing the weights and/or bias in buffers accessible by the processing NN for use. A network topology (or architecture) of processing NN 1200, which may be similar to processing NN 906 and may be a CNN, may have an upscaling layer 1202, layers 1 to N (1204 to 1208), a shuffle layer or unit 1210, and an adder 1212. Since the weights and biases of the processing NN are highly tailored to the current imaging conditions, the processing NN 1200 can have very low capacity and still perform effectively. One example processing NN 1200 may be a simple feed-forward topology with two characteristics common in topologies for SR. A residual-connection in the form of the upscaling layer 1202 uses bicubic interpolation to perform the upscaling. Also, CNN layers 1 to 4 are provided and are configured by experimentation and training. The last layer 4 provides a tensor of size $W \times H \times R^2$ where R is the upscaling ratio and $W \times H$ is the size of the image (or array). A pixel-shuffle layer or operation 1210 then shuffles the tensor ($W \times H \times R^2$) to produce a single channel of size $(R \cdot W) \times (R \cdot H)$. The convolved values are then added to the corresponding values of the upscaled image from the upscaling unit 1202 to produce the output HR image data.

It will be appreciated that all operations of the control flow and the pixel processing flow (processing NN) can be made differentiable with respect to all of the parameters. This includes the example statistics NN and example weight engine FCNN described above. By one form then, the entire system can be trained end-to-end using common gradient-descent algorithms for training deep-learning systems.

Also, the framework detailed above of de-coupling the adaptivity of the control flow from the pixel processing flow (and processing NN) can be applied in a large family of real-time video enhancement applications. For example, this framework may be applicable in video denoising, local tone-mapping, stabilization, and so forth.

The disclosed SR methods and systems were compared to conventional video SR architecture with a representative SR model. The output video is 1080p at 30 frames-per-second with ×4 upscaling (i.e., the input frame size is 270×320). The numbers given below are for the variants of each method which produced the results in FIGS. 2 and 4.

TABLE 1

Comparison between disclosed SR method and known SR model

|  | Known deep back-projection network | Disclosed SR in real-time on small devices. (control flow is triggered once per 10 frames) |
|---|---|---|
| # parameters | 10,426,358 | 440,742 in control flow 12,360 in pixel processing flow |
| # operations per output pixel | 345,328 | 9,574 |
| # T.Ops. ($10^{12}$) per second | 14.3 | 0.397 |
| Quality* | No generalization to real-world images on small devices (see FIG. 1) | High quality on real-world videos with |

*quality as measured by subjective evaluation mean opinion score (MOS), objective quality cannot be measured when upscaling real-world videos (no 'ground truth' is available).

In addition, any one or more of the operations of the processes in FIGS. 5-6, 8 and 10 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
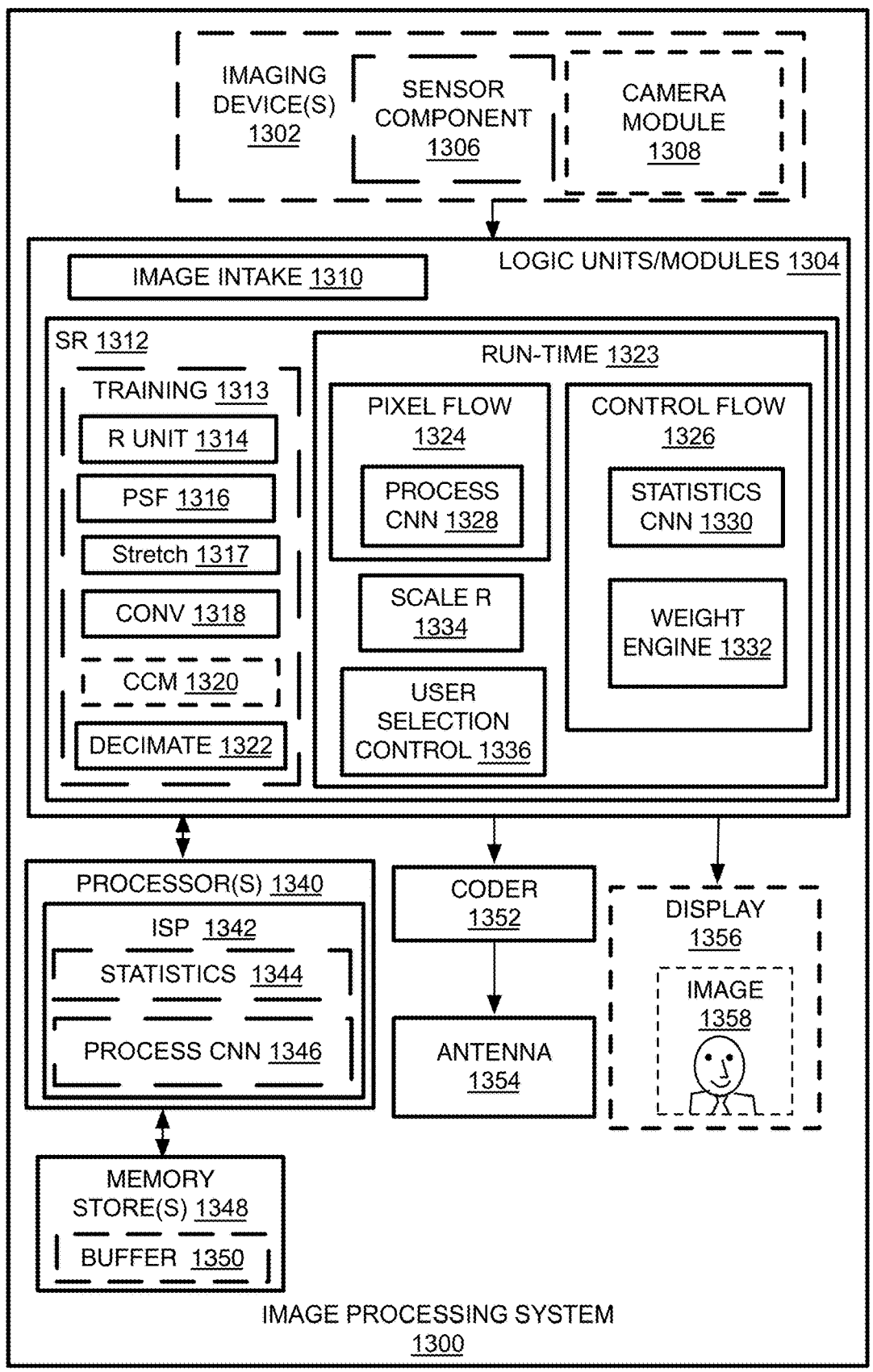
FIG. 13 is an illustrative diagram of an example image processing system

Referring to FIG. 13, an example image processing system 1300 is arranged in accordance with at least some implementations of the present disclosure. In various implementations, the example image processing system 1300 may have an imaging device 1302 to form or receive captured image data. This can be implemented in various ways. Thus, in one form, the image processing system 1300 may be a digital camera or other image capture device, and imaging device 1302, in this case, may be the camera hardware and camera sensor software, module, or component 1308. In other examples, imaging processing system 1300 may have an imaging device 1302 that includes, or may be a camera, and logic modules 1304 may communicate remotely with, or otherwise may be communicatively coupled to, the imaging device 1302 for further processing of the image data.

In either case, such technology may include a camera such as a digital camera system, a dedicated camera device, or an imaging phone, whether a still picture or video camera or some combination of both. Thus, in one form, imaging device 1302 may include camera hardware and optics including one or more sensors as well as auto-focus, zoom, aperture, ND-filter, auto-exposure, flash, and actuator controls. These controls may be part of a sensor module or component 1306 for operating the sensor. The sensor component 1306 may be part of the imaging device 1302, or may be part of the logical modules 1304 or both. Such sensor component can be used to generate images for a viewfinder and take still pictures or video. The imaging device 1302 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types as long as a multi-frame statistics gathering window can be used. In other examples, an RGB-Depth camera and/or microphone-array might be used in addition to or in the alternative to a camera sensor. In some examples, imaging device 1302 may be provided with an eye tracking camera. It will be understood that device 1300 may not have a camera and retrieves images from a memory, whether or not transmitted from another device.

In the illustrated example, the logic modules 1304 may include an image intake unit 1310 that pre-processes raw data or obtains images from memory (whether initial training images or LR images to be converted to HR) so that the images are ready for SR operations described herein. For this purpose, an SR unit 1312 may include a training unit 1313 and/or a run-time unit 1323 so that a single device could be performing just one or the other (training or runtime) instead of both. The training unit 1313 has a scale R unit 1314, a PSF unit 1316, stretch factor unit(s) 1317, a convolution unit 1318 that operates a blurring convolution operation, camera characteristic modifier unit(s) 1320, and decimate unit(s) 1322. The run-time unit 1323 may have a pixel processing flow unit 1324 with a processing NN or CNN 1328, a control flow unit 1326 with a statistics NN 1330 and a weight engine 1332 that also may have a NN such as a fully connected NN or CNN. A scale R unit 1334 and a user selection control unit 1336 also may be provided by the run-time unit 1323. These units or modules perform tasks as suggested by the label of the unit or module and as already described above with units or modules with similar or same labels. The units or modules may perform additional tasks than that described herein.

The logic modules 1304 may be communicatively coupled to the imaging device 1302 in order to receive raw image data when provided but is otherwise in communication with memory store(s) 1348 to retrieve images. The memory store(s) 1348 may have buffers 1350 or other external or internal memory formed of RAM such as DRAM, cache, or many other types of memory.

The image processing system 1300 may have one or more of the processors 1340 such as the Intel Atom, one or more dedicated image signal processors (ISPs) 1342. The processors 1340 may include any graphics accelerator, GPU, and so forth. The system 1300 also may have one or more displays 1356, coder 1352, and antenna 1354. It will be understood that at least parts of the units, components, or modules mentioned may be considered to be at least partly formed or on at least one of the processors 1340, such as any of the NNs being at least partly formed by the ISP 1342 or GPU including the statistics NN 1344 or the processing NN 1346.

In one example implementation, the image processing system 1300 may have the display 1356, at least one processor 1340 communicatively coupled to the display, at least one memory 1348 communicatively coupled to the processor and having the buffer 1350 by one example for storing initial images, LR images, HR images, statistics, NN parameters, and so forth and any of the data mentioned herein. The coder 1328 and antenna 1354 may be provided to compress or decompress image data for transmission to or from other devices that may display or store the images. It will be understood that the image processing system 1300 may also include a decoder (or coder 1352 may include a decoder) to receive and decode image data for processing by the system 1300. Otherwise, the processed image 1358 may be displayed on display 1356 or stored in memory 1324. As illustrated, any of these components may be capable of communication with one another and/or communication with portions of logic modules 1304 and/or imaging device 1302. Thus, processors 1340 may be communicatively coupled to both the image device 1302 and the logic modules 1304 for operating those components. By one approach, although image processing system 1300, as shown in FIG. 13, may include one particular set of blocks or actions associated with particular components or modules, these blocks or actions may be associated with different components or modules than the particular component or module illustrated here.

Figure 14:
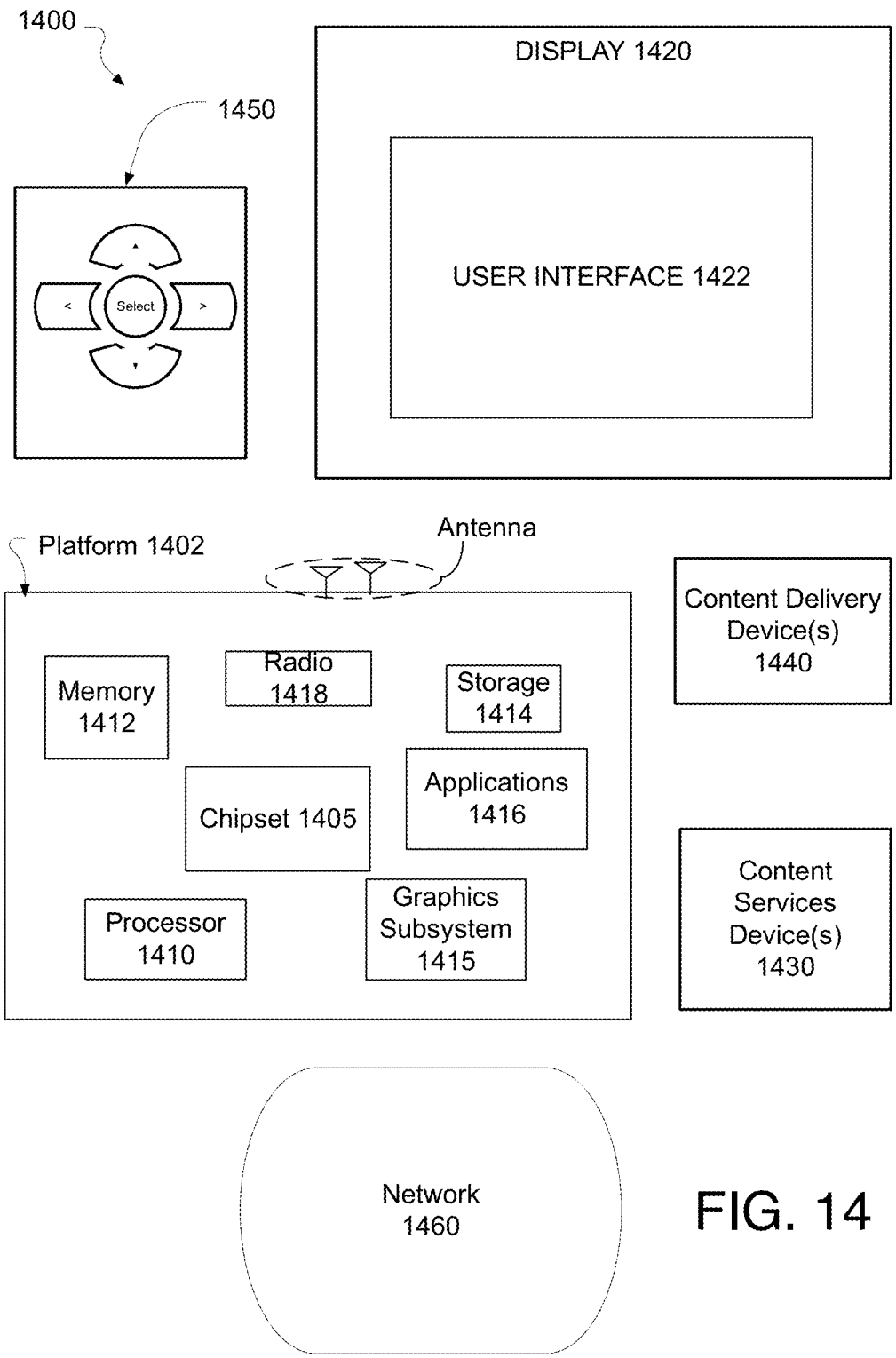
FIG. 14 is an illustrative diagram of an example system.

Referring to FIG. 14, an example system 1400 in accordance with the present disclosure operates one or more aspects of the image processing system described herein. It will be understood from the nature of the system components described below that such components may be associated with, or used to operate, certain part or parts of the image processing system described above. In various implementations, system 1400 may be a media system although system 1400 is not limited to this context. For example, system 1400 may be incorporated into a digital still camera, digital video camera, or other mobile device with camera or video functions. Otherwise, system 1400 may be any device whether it has a camera or not, such as a mobile small device or an edge device. System 1400 may be any of an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, storage 1414, graphics subsystem 1415, applications 1416, and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU), image signal processor (ISP), or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In implementations, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In implementations, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various implementations, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various implementations, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
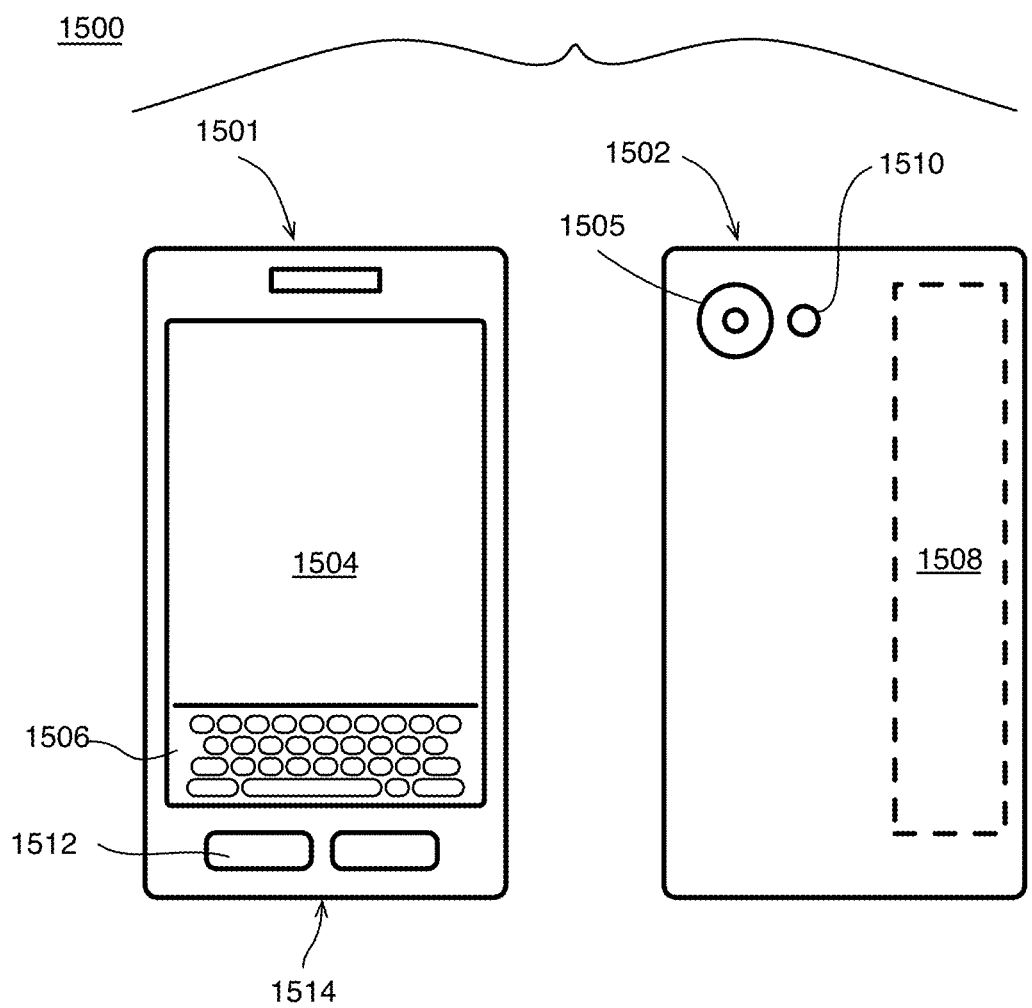
FIG. 15 is an illustrative diagram of an example system, all arranged in accordance with at least some implementations of the present disclosure.

Referring to FIG. 15, a small form factor device 1500 is one example of the varying physical styles or form factors in which systems 1300 or 1400 may be embodied. By this approach, device 1500 may be implemented as a small or edge mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone 1514, or may be digitized by a voice recognition device. As shown, device 1500 may include a camera 1505 (e.g., including at least one lens, aperture, and imaging sensor) and a flash 1510 integrated into back 1502 (or elsewhere) of device 1500. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method of super-resolution image processing comprises obtaining at least one lower resolution (LR) image; generating at least one high resolution (HR) image comprising inputting image data of the at least one LR image into at least one super-resolution (SR) neural network; separately generating weights or biases or both comprising using statistics of the LR image; and providing the weights or biases or both to the SR neural network to be used to generate the at least one HR image.

By one or more second implementation, and further to the first implementation, wherein the weights or biases are generated at a control flow operated in parallel to a pixel processing flow that operates the SR neural network.

By one or more third implementations, and further to the first implementation, wherein the weights or biases are generated at a control flow operated in parallel to a pixel processing flow that operates the SR neural network, and wherein a rate of generating the weights or biases or both at the control flow is slower than a frame rate at the SR neural network.

By one or more fourth implementations, and further to any of the first to third implementation, wherein the method comprising obtaining a video sequence of the LR images, and wherein the weights or biases or both are updated at predetermined image intervals along the video sequence rather than with every image in the video sequence.

By one or more fifth implementations, and further to any of the first to fourth implementation, wherein the weights or biases or both are generated to be used for a target image and are arranged to be used on images near the target image along a video sequence of the images when the weights or biases are generated too late to be used on the target image.

By one or more sixth implementations, and further to any of the first to fifth implementation, wherein the method comprising inputting at least one of the LR images into a convolutional neural network (CNN) to generate statistical values.

By one or more seventh implementations, and further to any of the first to fifth implementation, wherein the method comprising inputting at least one of the LR images into a convolutional neural network (CNN) to generate statistical values, and wherein the statistics comprises global weighted average values each representing an entire image.

By one or more eighth implementations, and further to any of the first to seventh implementation, wherein the weights or biases are generated by using the statistics to generate a convolution kernel of weights.

By one or more ninth implementations, and further to any of the first to eighth implementation, wherein generating the weights or biases comprises inputting user preference values and the statistics into a weight engine neural network to generate a proportioning coefficient to apply to a convolution kernel of weights.

By one or more tenth implementations, a system for image processing comprises at least one processor; and at least one memory communicatively coupled to the at least one processor and storing a video sequence of low resolution (LR) images, the at least one processor being configured to operate by: generating higher resolution (HR) images comprising inputting image data of the LR images into at least one super-resolution (SR) neural network; generating weights or biases or both comprising using LR image statistics and generated at intervals of a number of images along the video sequence; and providing the weights or biases or both to the SR neural network at the intervals to be used to generate the HR images.

By one or more eleventh implementations, and further to the tenth implementation, wherein the statistics are generated in a statistics neural network that receives the image data as input and generates weights from a weight layer to be applied to statistics values of a value layer to generate outputted statistics.

By one or more twelfth implementations, and further to any of the tenth to eleventh implementation, wherein the statistics comprises a vector of global weighted values, each value representing an entire image.

By one or more thirteenth implementations, and further to any of the tenth to twelfth implementation, wherein the generating of weights or biases comprises inputting the statistics into a weight engine neural network that generates a proportion coefficient to be applied to a convolution kernel of weights.

By one or more fourteenth implementations, and further to any of the tenth to the thirteenth implementation, wherein the neural network uses the latest available weights or bias or both rather than waiting for updated weights or bias or both to be generated when the generation of the weights or bias or both is late.

By one or more fifteenth implementations, and further to any of the tenth to fourteenth implementation, wherein the SR neural network is trained by intentionally blurring input training images.

By one or more sixteenth implementations, a method of image processing comprises obtaining initial training images; generating blurred training images comprising intentionally blurring one or more of the initial training images; generating low resolution training images or high resolution training images or both and comprising using the blurred images; and training a super-resolution neural network to generate high resolution pixel values comprising using the low resolution training images or high resolution training images or both.

By one or more seventeenth implementations, and further to the sixteenth implementation, the method comprising blurring the initial training images comprising changing image data of the initial training images to simulate blurring caused at least in part by real camera lenses.

By one or more eighteenth implementations, and further to the sixteenth or seventeenth implementation, wherein the method comprises blurring the initial training images comprising applying a point spread function (PSF)-related value to image data of the initial training images.

By one or more nineteenth implementations, and further to any of the sixteenth or seventeenth implementations, wherein the method comprises blurring the initial training images comprising applying a point spread function (PSF)-related value to image data of the initial training images, and randomly selecting a PSF-related value to apply to individual initial training images and among multiple PSF-related values available to be used for blurring and each related to a different PSF value.

By one or more twentieth implementations, and further to any of the sixteenth to nineteenth implementation, wherein the method comprises training SR the neural network to convert the resolution on input LR images with blurring caused by various PSF values.

By one or more twenty-first implementations, and further to any of the sixteenth to twentieth implementations, wherein the method comprises decimating a blurred image to generate a desired size of the low resolution training image or high resolution training image or both.

By one or more twenty-second implementations, at least one non-transitory article has at least one computer readable medium comprising a plurality of instructions that in response to being executed on a computing device, cause the computing device to operate by: obtaining initial training images; generating blurred training images comprising intentionally blurring one or more of the initial training images; generating low resolution training images or high resolution training images or both and comprising using the blurred images; and training a super-resolution neural network to generate high resolution pixel values comprising using the low resolution training images or high resolution training images or both.

By one or more twenty-third implementations, and further to the twenty-second implementation, wherein the instructions cause the computing device to operate by generating a stretch factor stretching a size of a point spread function (PSF) and set to compensate for reducing a size of the initial training image.

By one or more twenty-fourth implementations, and further to the twenty-second implementation, wherein the instructions cause the computing device to operate by generating a stretch factor stretching a size of a point spread function (PSF) and set to compensate for reducing a size of the initial training image, and wherein the stretch factor is used to convolve the initial training image to form the blurred images.

By one or more twenty-fifth implementations, and further to any of the twenty-second to twenty-fourth implementation, wherein the instructions cause the computing device to operate during run-time by inputting low resolution images to the SR neural network while separately generating weights or biases or both of the SR neural network based on statistics of the low resolution images.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A method comprising:
   obtaining low resolution (LR) images of a video sequence;
   generating, with a first neural network, at least one of weights or biases based on statistics of the LR images, the at least one of the weights or the biases generated at a rate less than a frame rate of the video sequence;
   providing the at least one of the weights or the biases to a second neural network different from the first neural network, the second neural network to implement a super-resolution (SR) neural network to perform high resolution (HR) image generation; and
   generating, with the SR neural network, HR images based on the LR images at the frame rate of the video sequence.

2. The method of claim 1, wherein the generating of the at least one of the weights or the biases is in parallel with the generating of the HR images with the SR neural network.

3. The method of claim 1, wherein the generating of the at least one of the weights or the biases includes updating the at least one of the weights or the biases at predetermined image intervals along the video sequence.

4. The method of claim 1, wherein the first neural network is a convolutional neural network (CNN).

5. The method of claim 4, wherein the statistics include global weighted average values, a first one of the global weighted average values representing an entire image.

6. The method of claim 1, wherein the generating of the at least one of the weights or the biases by includes using the statistics to generate a convolution kernel of weights.

7. The method of claim 1, wherein the generating of the at least one of the weights or the biases includes inputting user preference values and the statistics into the first neural network to generate a coefficient to apply to a convolution kernel of weights.

8. A system comprising:
   interface circuitry;
   instructions; and
   at least one programmable circuit to be programmed based on the instructions to:
   generate high resolution (HR) images corresponding to low resolution (LR) images of a video sequence, the HR images generated at a frame rate of the video sequence based on at least one super-resolution (SR) neural network;
   generate, with a second neural network different from the at least one SR neural network, at least one of weights or biases based on statistics of the LR images, the at least one of the weights or biases generated at a rate lower than the frame rate of the video sequence; and
   provide the at least one of the weights or the biases to update the at least one SR neural network.

9. The system of claim 8, including a third neural network to generate the statistics based on input image data.

10. The system of claim 8 wherein the statistics include a vector of global weighted values, a first one of the global weighted values representing an entire image.

11. The system of claim 8, wherein the second neural network is to generate a coefficient to be applied to a convolution kernel of weights.

12. The system of claim 8, wherein the SR neural network is trained based on blurred input training images.

13. The system of claim 8, wherein to generate the weights, the second neural network is to:
- determine a coefficient based on the statistics of the LR images; and
- combine a first weight kernel and a second weight kernel based on the coefficient to determine an updated weight kernel of the SR neural network.

14. At least one non-transitory computer readable medium comprising computer readable instructions to cause at least one programmable circuit to at least:
- cause a first neural network to generate at least one of weights or biases based on statistics of low resolution (LR) images of a video sequence, the at least one of the weights or the biases generated at a rate less than a frame rate of the video sequence;
- provide the at least one of the weights or the biases to a second neural network different from the first neural network, the second neural network to perform high resolution (HR) image generation; and
- cause the second neural network to generate HR images based on the LR images at the frame rate of the video sequence.

15. The at least one non-transitory computer readable medium of claim 14, wherein the rate corresponds to intervals of a number of LR images along the video sequence.

16. The at least one non-transitory computer readable medium of claim 14, wherein the computer readable instructions are to cause one or more of the at least one programmable circuit to cause the first neural network to generate the at least one of the weights or the biases and the second neural network to generate at least some of the HR images in parallel.

17. The at least one non-transitory computer readable medium of claim 14, wherein the first neural network is a convolution neural network.

18. The at least one non-transitory computer readable medium of claim 14, wherein the computer readable instructions are to cause the first neural network to generate a coefficient to be applied to a convolution kernel of weights.

19. The at least one non-transitory computer readable medium of claim 14, wherein the computer readable instructions are to cause the first neural network to:
- determine a coefficient based on the statistics of the LR images; and
- combine a first weight kernel and a second weight kernel based on the coefficient to determine an updated weight kernel of the second neural network.

20. The at least one non-transitory computer readable medium of claim 14, wherein the computer readable instructions are to cause one or more of the at least one programmable circuit to train the second neural network based on blurred training images.

* * * * *

UNITED STATES PATENT AND TRADEMARK OFFICE
CERTIFICATE OF CORRECTION

| | | |
|---|---|---|
| PATENT NO. | : 12,361,515 B2 | Page 1 of 1 |
| APPLICATION NO. | : 17/213489 | |
| DATED | : July 15, 2025 | |
| INVENTOR(S) | : Elron et al. | |

It is certified that error appears in the above-identified patent and that said Letters Patent is hereby corrected as shown below:

In the Claims

Column 32, Line 33 (Claim 6), delete "by"

Signed and Sealed this
Twenty-sixth Day of August, 2025

Coke Morgan Stewart
*Acting Director of the United States Patent and Trademark Office*